US011410529B2

(12) United States Patent
Barovič et al.

(10) Patent No.: US 11,410,529 B2
(45) Date of Patent: Aug. 9, 2022

(54) OUT OF RANGE TRACKING DEVICE DETECTION

(71) Applicant: Chipolo, d.o.o., Trbovlje (SI)

(72) Inventors: Domen Barovič, Trbovlje (SI); Klemen Bratec, Trbovlje (SI); Marko Engelman, Škofja Loka (SI); Grega Podlesek, Škofljica (SI); Andreas Luka de Reggi, Ljubljana (SI); Dejan Todorović, Ljubljana (SI); Jure Zdovc, Trbovlje (SI)

(73) Assignee: CHIPOLO, D.O.O., Trbovlje (SI)

( * ) Notice: Subject to any disclaimer, the term of this patent is extended or adjusted under 35 U.S.C. 154(b) by 0 days.

(21) Appl. No.: 17/338,854

(22) Filed: Jun. 4, 2021

(65) Prior Publication Data

US 2021/0383672 A1    Dec. 9, 2021

Related U.S. Application Data

(60) Provisional application No. 63/035,235, filed on Jun. 5, 2020.

(51) Int. Cl.
*H04N 5/44* (2011.01)
*G08B 21/24* (2006.01)
*H04W 4/029* (2018.01)
*H04W 64/00* (2009.01)

(52) U.S. Cl.
CPC ............ *G08B 21/24* (2013.01); *H04W 4/029* (2018.02); *H04W 64/006* (2013.01)

(58) Field of Classification Search
CPC ..... G08B 21/24; H04W 4/029; H04W 64/006
See application file for complete search history.

(56) References Cited

U.S. PATENT DOCUMENTS

| | | | |
|---|---|---|---|
| 6,225,906 B1* | 5/2001 | Shore | G08B 25/14 340/10.5 |
| 6,989,741 B2* | 1/2006 | Kenny | G08B 21/0227 340/505 |
| 7,342,497 B2* | 3/2008 | Chung | G07G 1/009 340/572.1 |
| 9,643,091 B2 | 5/2017 | Vock et al. | |
| 10,002,515 B2 | 6/2018 | Chapiewski et al. | |
| 10,026,287 B2 | 7/2018 | Sarkar | |
| 10,575,138 B1 | 2/2020 | Klinkner et al. | |
| 2003/0034887 A1 | 2/2003 | Crabtree et al. | |
| 2005/0116823 A1* | 6/2005 | Paulsen | G08B 13/2462 701/472 |
| 2005/0200478 A1 | 9/2005 | Koch et al. | |
| 2007/0229350 A1* | 10/2007 | Scalisi | H04L 67/18 342/350 |
| 2011/0084806 A1 | 4/2011 | Perkins | |
| 2013/0015971 A1 | 1/2013 | Caporizzo | |
| 2013/0179692 A1* | 7/2013 | Tolba | H04L 63/0861 713/179 |
| 2017/0352250 A1 | 12/2017 | Chapiewski et al. | |
| 2017/0353829 A1 | 12/2017 | Kumar et al. | |
| 2021/0136553 A1* | 5/2021 | Pope | G08B 21/0233 |

FOREIGN PATENT DOCUMENTS

| | | |
|---|---|---|
| EP | 2888725 B1 | 5/2019 |
| GB | 2505324 B | 7/2014 |

* cited by examiner

*Primary Examiner* — Munear T Akki
(74) *Attorney, Agent, or Firm* — Van Court & Aldridge LLP

(57) ABSTRACT

Systems, methods, and computer-readable media for alerting users of out of range tracking devices are provided.

22 Claims, 8 Drawing Sheets

OUT OF RANGE TRACKING DEVICE DETECTION

CROSS-REFERENCE TO RELATED APPLICATION(S)

This application claims the benefit of prior filed U.S. Provisional Patent Application No. 63/035,235, filed Jun. 5, 2020, which is hereby incorporated by reference herein in its entirety.

COPYRIGHT NOTICE

At least a portion of the disclosure of this patent document contains material that may be subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to tracking devices and, more particularly, to alerting users of out of range tracking devices.

BACKGROUND OF THE DISCLOSURE

Users can attach tracking devices to one or more personal objects, such as keys, a wallet, and the like. The tracking device can communicatively couple to a mobile device of the user and/or to a device of a community member. However, currently known methods of determining when a tracking device has been left behind by a user are inefficient and ineffective.

SUMMARY OF THE DISCLOSURE

This document describes systems, methods, and computer-readable media for alerting users of out of range tracking devices.

For example, a method is provided for establishing a tracking device as lost using a user device, wherein the user device may include a first communication component operative to communicate using a first communication protocol, a second communication component operative to communicate using a second communication protocol, a location determination module operative to determine location of the user device, a motion determination module operative to determine motion of the user device, and a processing module, the method may include periodically attempting to detect, with the processing module, a tracking device decoupling event between the tracking device and the user device via the second communication protocol of the second communication component, in response to detecting the tracking device decoupling event: running, with the processing module, an out-of-range ("OOR") process for the tracking device that may include periodically attempting to determine, with the processing module, if the tracking device is detected by the second communication component using the second communication protocol and determining, with the processing module, if any OOR evaluation capability of a plurality of OOR evaluation capabilities is currently available to the user device, and periodically attempting to detect, with the processing module, a tracking device recoupling event between the tracking device and the user device via the second communication protocol of the second communication component, the method may further include, in response to detecting the tracking device recoupling event, resetting and stopping, with the processing module, the OOR process for the tracking device, in response to determining that the tracking device is detected by the second communication component using the second communication protocol, resetting and re-running, with the processing module, the OOR process for the tracking device, in response to determining that a first OOR evaluation capability of the plurality of OOR evaluation capabilities is currently available to the user device, periodically collecting, with the processing module, first OOR evaluation data of the first OOR evaluation capability, and determining, with the processing module, if the collected first OOR evaluation data triggers a potential first OOR evaluation event, in response to determining that the collected first OOR evaluation data triggers the potential first OOR evaluation event: combining, with the processing module, all collected OOR evaluation data of the OOR process, initiating, with the processing module, processing of the combined OOR evaluation data of the OOR process that may include calculating an OOR confidence level and determining if the calculated OOR confidence level meets a confidence level threshold, and initiating, with the processing module, a confidence delay timer that has a confidence delay duration, in response to determining that no OOR evaluation capability of the plurality of OOR evaluation capabilities is currently available to the user device, initiating, with the processing module, a last resort timer that has a last resort duration, in response to expiration of an initiated last resort timer or expiration of an initiated confidence delay timer, triggering, with the processing module, an OOR alert for the tracking device, and, in response to a determination by the processing of the combined OOR evaluation data of the OOR process that the calculated OOR confidence level does not meet the confidence level threshold, resetting and re-running, with the processing module, the OOR process for the tracking device, wherein the resetting the OOR process for the tracking device may include stopping and resetting any initiated timer.

As another example, a user electronic device is provided that may include a first communication component operative to communicate using a first communication protocol, a second communication component operative to communicate using a second communication protocol different than the first communication protocol, a location determination module operative to determine location of the user electronic device, a motion determination module operative to determine motion of the user electronic device, and a processing module operative to attempt to detect a tracking device decoupling event between a tracking device and the user electronic device via the second communication protocol of the second communication component, in response to a detection of the tracking device decoupling event: run an out-of-range ("OOR") process for the tracking device that may include attempting to determine if the tracking device is detected by the second communication component using the second communication protocol and determining if any OOR evaluation capability of a plurality of OOR evaluation capabilities is currently available to the user electronic device, and attempt to detect a tracking device recoupling event between the tracking device and the user electronic device via the second communication protocol of the second communication component, wherein the processing module is further operative to, in response to detection of the tracking device recoupling event, reset and stop the OOR process for the tracking device, in response to a determination that the tracking device is detected by the second communication component using the second communication protocol, reset and re-run the OOR process for the tracking device, in response to a determination that a first OOR evaluation capability of the plurality of OOR evaluation capabilities is currently available to the user electronic device: collect first OOR evaluation data of the first OOR evaluation capability, and determine if the collected first OOR evaluation data triggers a potential first OOR evaluation event, in response to a determination that the collected first OOR evaluation data triggers the potential first OOR evaluation event: combine all collected OOR evaluation data of the OOR process, initiate processing of the combined OOR evaluation data of the OOR process that may include calculating an OOR confidence level and determining if the calculated OOR confidence level meets a confidence level threshold, and initiate a confidence delay timer that has a confidence delay duration, in response to expiration of an initiated confidence delay timer, trigger an OOR alert for the tracking device, and in response to a determination by the processing of the combined OOR evaluation data of the OOR process that the calculated OOR confidence level does not meet the confidence level threshold, stop and reset any initiated timer, wherein the determination that the first OOR evaluation capability of the plurality of OOR evaluation capabilities is currently available to the user electronic device may include one of: determining that the first communication component is enabled to communicate with a remote device using the first communication protocol, determining that the location determination module is enabled to determine location of the user electronic device, or determining that the motion determination module is enabled to determine motion of the user electronic device.

As yet another example, a non-transitory machine readable medium is provided for storing a program for execution by at least one processing unit of a user device, the program for establishing a tracking device as lost, the program may include sets of instructions for attempting to detect a tracking device decoupling event between the tracking device and the user device via a first communication protocol, in response to detecting a tracking device decoupling event: running an out-of-range ("OOR") process for the tracking device that may include attempting to determine if the tracking device is detected using the first communication protocol, and determining if any OOR evaluation capability of a plurality of OOR evaluation capabilities is currently available to the user device, and attempting to detect a tracking device recoupling event between the tracking device and the user device via the first communication protocol, the program may include additional sets of instructions for, in response to detecting a tracking device recoupling event, stopping the OOR process for the tracking device, in response to determining that the tracking device is detected using the first communication protocol, restarting the OOR process for the tracking device, in response to determining that a first OOR evaluation capability of the plurality of OOR evaluation capabilities is currently available to the user device: collecting first OOR evaluation data of the first OOR evaluation capability, and determining if the collected first OOR evaluation data triggers a potential first OOR evaluation event, in response to determining that the collected first OOR evaluation data triggers the potential first OOR evaluation event: combining all collected OOR evaluation data of the OOR process, initiating processing of the combined OOR evaluation data of the OOR process that may include calculating an OOR confidence level and determining if the calculated OOR confidence level meets a confidence level threshold, and initiating a confidence delay timer that has a confidence delay duration, in response to expiration of an initiated confidence delay timer, triggering an OOR alert for the tracking device, and, in response to a determination by the processing of the combined OOR evaluation data of the OOR process that the calculated OOR confidence level does not meet the confidence level threshold, resetting any initiated confidence delay timer, wherein the collecting first OOR evaluation data of the first OOR evaluation capability may include one of: coupling/decoupling event data between the user device and any other device via a second communication protocol that is different than the first communication protocol, user device location data, or user device motion data.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

Systems, methods, and computer-readable media for alerting users of out of range tracking devices are provided.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein may refer to and encompass any and all possible combinations of one or more of the associated listed items. The terms "includes," "including," "comprises," and/or "comprising," when used in this specification, may specify the presence of stated features, integers, steps, operations, elements, and/or components, but do not preclude the presence or addition of one or more other features, integers, steps, operations, elements, components, and/or groups thereof.

The term "if" may, optionally, be construed to mean "when" or "upon" or "in response to determining" or "in response to detecting," depending on the context. Similarly, the phrase "if it is determined" or "if [a stated condition or event] is detected" may, optionally, be construed to mean "upon determining" or "in response to determining" or "upon detecting [the stated condition or event]" or "in response to detecting [the stated condition or event]," depending on the context.

As used herein, the terms "computer," "personal computer," "device," "computing device," "tracking device," "server device," and "controller device" may refer to any programmable computer system that is known or that will be developed in the future. In certain embodiments, a computer may be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system" may be intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Figure 1:
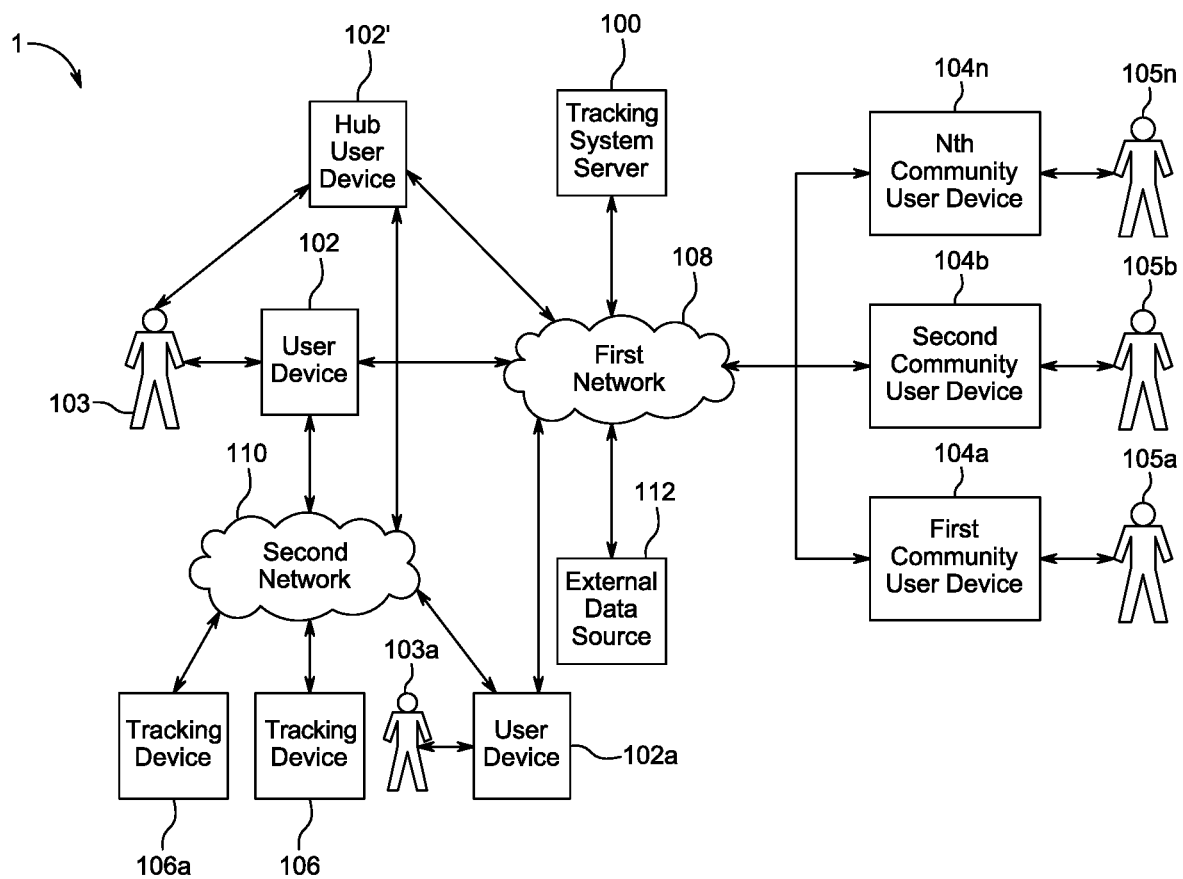
FIG. 1 is a schematic diagram illustrating an exemplary tracking system environment in which a tracking device can be monitored, according to some embodiments of the disclosure.

FIG. 1 illustrates an example tracking environment or tracking system 1 in which a tracking device and user device can operate. System 1 may include a tracking system server 100 (e.g., a system of one or more servers or other suitable computing devices) that may be communicatively coupled via a first network 108 to a particular or of interest user device 102 that may be associated with a particular or of interest user 103. Tracking system server 100 may also be communicatively coupled via first network 108 to at least one additional user device 102a that may be associated with another particular user 103a (e.g., a user with a particular relationship to user 103, such as a sibling or partner or roommate or the like of user 103 with whom user 103a may share one or more tracking devices (e.g., a tracking device 106)). Tracking system server 100 may also be communicatively coupled via first network 108 to a plurality of community user devices 104a-104n (e.g., as may be collectively referred to herein as "community user devices 104") that may be respectively associated with a plurality of community users 105a-105n (e.g., as may be collectively referred to herein as "community users 105"). Tracking system 1 may be configured to enable user 103 to manage and/or locate a particular or of interest tracking device 106 that may be associated with user 103 and user device 102. For example, user 103 can attach such a tracking device 106 to or enclose such a tracking device 106 within an object (not shown), such as a wallet, keys, a car, a bike, a pet, or any other object that the user may want to track. User 103 can then use user device 102 (e.g., a mobile device or other device (e.g., by way of a software application installed on the device) or service) to track the tracking device and corresponding object. For example, user device 102 may be configured to perform a local search for a tracking device 106 attached to a nearby object. However, in situations where user 103 may be unable to locate tracking device 106 using their own user device 102 (e.g., if tracking device 106 is beyond a distance within which user device 102 and tracking device 106 can communicate), user 103 can utilize the capabilities of a community of users of tracking system 1.

In some embodiments, tracking system 1 may be configured to utilize the capabilities of community user devices 104 to locate tracking device 106 if the location of the tracking device is unknown to user 103 and beyond the capabilities of user device 102 to track. In some configurations, user 103 may be associated with (e.g., own and/or control) and register multiple tracking devices 106. Although FIG. 1 illustrates a particular arrangement of tracking system 1, user device 102, community user devices 104, and tracking device 106, various additional arrangements are possible. FIG. 1 also illustrates an external data source 112 that may be communicatively coupled to tracking system server 100 to provide additional, external data to tracking system 1, such as data from one or more social networking systems, messaging systems, calendaring systems, banking systems, budgeting systems, vendor systems, online retailers, parking regulation databases, weather service, travel agency, transportation services, ride-sharing systems, geo-locating systems, contact management systems, and/or the like, as may be described by U.S. Patent Application Publication No. 2017-0352250, which is hereby incorporated by reference herein in its entirety.

In some configurations, user 103 may be part of the community of users 105. Further, one or more users 105 may own and register one or more tracking devices 106. Thus, any one of the users within the community of users 105 can communicate with tracking system server 100 and utilize the capabilities of the community of users 105 in addition to user 103 to locate a tracking device 106 that has been lost.

Tracking system server 100, user device 102, and plurality of community user devices 104 may communicate using any communication platforms and technologies suitable for transporting data and/or communication signals, including known communication technologies, devices, media, and protocols supportive of remote data communications.

In certain embodiments, tracking system server 100, user device 102, and community user devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between tracking system server 100, user device 102, and community user devices 104. User device 102 may also be in communication with a tracking device 106 via a second network 110 (e.g., device 102 may be communicatively coupled to tracking device 106 via its own communication network 110 (e.g., a Bluetooth link)). User device 102a may also be in communication with tracking device 106 (e.g., a shared tracking device between users 103 and 103a of respective user devices 102/102' and 102a), such as where user device 102a may be communicatively coupled to tracking device 106 via communication network 110 or another distinct communication network (not shown) (e.g., a Bluetooth link)). One or more community user devices 104 may also be able to be communicatively coupled to tracking device 106 via any suitable communication network (e.g., Bluetooth link) (not shown). Second network 110 may be a similar or different type of network as first network 108. In some embodiments, second network 110 may include a wireless network with a limited communication range, such as, but not limited to, a Bluetooth or Bluetooth Low Energy ("BLE") or ultra-wideband ("UWB") wireless network (e.g., any suitable personal area network). In some configurations, second network 110 may be a point-to-point network that may include tracking device 106 and one or more user devices that may fall within a proximity of tracking device 106. In such embodiments, each one of user device 102 and community user devices 104 may only be able to communicate with tracking device 106 if it is within a close proximity to the tracking device, though in other embodiments, the tracking device can use long-distance communication functionality (e.g., for instance, a GSM transceiver) to communicate with either a user device 102/104 or tracking system server 100 at any distance. In some configurations, user device 102 and one or more community user devices 104 may each be associated with multiple tracking devices associated with various users.

As shown, in some embodiments, tracking system 1 may be configured to enable user 103 to manage and/or locate another user device 102' (e.g., a hub user device) that may be associated with user 103 and may be operative to track at least tracking device 106 (e.g., via second network 110 or a similar but distinct network (e.g., a unique Bluetooth link)). Unlike user device 102 that may be configured to be mobile and travel with user 103 wherever user 103 may go, hub user device 102' may be configured to be stationary (e.g., a stationary or hub user device may be coupled to a wall hanging next to the front door of a user's home or elsewhere at or near a user-specific location, which may be stationary throughout a user's use of system 1). A stationary hub user device at a particular location (e.g., the user's home, the user's office, the user's vehicle, etc.) may act as a device that may periodically scan for a user's tracking device and report to the web server or the main user device if the tracking device is close to the hub user device. For example, tracking system server 100 may be continuously communicatively coupled or couplable to hub user device 102' (e.g., via first network 108) such that server 100 may be enabled to routinely determine if a tracking device is communicatively coupled to the hub user device and determine the location (e.g., stationary location) of the hub user device (e.g., such that server 100 may be enabled to determine if tracking device 106 remains at a user's home via communication with a home hub user device. Like any user device, it is to be appreciated that hub user device 102' may be configured to scan for or otherwise communicatively couple with any tracking device regardless of whether or not the tracking device shares an owner with the hub user device.

As shown in FIG. 1, user device 102 may be associated with user 103. User device 102 can be configured to perform one or more functions described herein with respect to locating tracking devices (e.g., tracking device 106). For example, user device 102 can receive input from user 103 that may be representative of information about user 103 and information about a tracking device 106, and then user device 102 may provide the received user information, tracking device information, and/or information about user device 102 to tracking system server 100. Accordingly, tracking system server 100 may be able to associate user device 102, user 103, and/or tracking device 106 with one another. In some embodiments, user device 102 can communicate with tracking device 106 and provide information regarding the location of the tracking device to user 103. For example, user device 102 can detect a communication signal from tracking device 106 (e.g., by way of second network 110) as well as a strength of the communication signal and/or other measure of proximity to determine an approximate distance (and/or a relative direction) between user device 102 and tracking device 106. User device 102 can then provide this information to user 103 (e.g., by way of one or more user interfaces of user device 102) to assist user 103 to locate tracking device 106. Accordingly, user 103 can use user device 102 to track and locate tracking device 106 and, thus, a corresponding object associated with tracking device 106. If user device 102 is located beyond an immediate range of communication with tracking device 106 (e.g., beyond a communication range of second network 110), user device 102 may be configured to send an indication that tracking device 106 is lost (e.g., out-of-range) to tracking system server 100, which may request assistance in finding the tracking device. User device 102 can send an indication of a lost tracking device in response to a command from user 103. For example, once user 103 has determined that tracking device 106 is lost, the user can provide user input to user device 102 (e.g., by way of a user interface), requesting that user device 102 send an indication that tracking device 106 is lost to tracking system server 100. In some examples, a lost indication can include information identifying user 103 (e.g., name, username, authentication information), information associated with user device 102 (e.g., a mobile phone number or any other suitable user device identifier), information associated with the tracking device (e.g., a unique tracking device identifier), and/or a location of the user (e.g., a GPS location of user device 102 at the time the request is sent).

Tracking system server 100 can be configured to provide a number of features and services associated with the tracking and management of a plurality of tracking devices and/or users associated with the tracking devices. For example, tracking system server 100 can manage information and/or user profiles associated with user 103 and community users 105. In particular, tracking system server 100 can manage information associated with tracking device 106 and/or other tracking devices (e.g., tracking device 106a) associated with user 103 and/or the community users 105.

Tracking system server 100 can receive an indication that tracking device 106 is out-of-range or lost from user device 102. Tracking system server 100 can then process the indication in order to help user 103 find tracking device 106. For example, tracking system server 100 can utilize the capabilities of community user devices 104 to help find tracking device 106. In particular, tracking system server 100 may set a flag for a tracking device 106 to indicate that the tracking device 106 is lost and monitor communications received from one or more of community user devices 104 that may indicate the location of one or more tracking devices 106 within proximity of such community user device(s) 104. Tracking system server 100 may be configured to determine whether a specific location is associated with a lost tracking device 106 and may provide any location updates associated with the tracking device 106 to user device 102. In one example, tracking system server 100 may receive constant updates of tracking device 106 locations regardless of whether a tracking device 106 is lost and provide a most recent updated location of tracking device 106 in response to receiving an indication that the tracking device is lost.

In some configurations, tracking system server 100 can send a location request associated with a tracking device 106 to one, some, or each of community user devices 104. The location request can include any instructions and/or information necessary for the community user device(s) 104 to find a tracking device 106. For example, a location request can include a unique identifier associated with tracking device 106 that can be used by one, some, or each community user device 104 to identify the tracking device. Accordingly, if one of the community devices detects a communication from the tracking device (e.g., if the community user device is within range or moves within range of the communication capabilities of the tracking device (e.g., via second network 110) and receives a signal from the tracking device including or associated with the unique identifier associated with the tracking device), the community user device may be configured to inform the tracking system server. Using the information received from the community user device(s) 104, tracking system server 100 may be configured to inform the user (e.g., by way of user device 102) of a potential location of tracking device 106.

Tracking system server 100 may be configured to communicate with a plurality of community user devices 104 associated with corresponding community users 105. For example, an implementation may include a first community user device 104*a* associated with a first community user 105*a*, a second community user device 104*b* associated with a second community user 105*b*, and additional communication user devices associated with additional community users up to an Nth community user device 104*n* associated with an Nth community user 105*n*. Community user devices 104 may also include functionality that may enable each community user device 104 to identify a tracking device 106 within a proximity of the community user device 104. In one example, a first community user device 104*a* within proximity of a tracking device 106 can communicate with the tracking device, identify the tracking device (e.g., using a unique identifier associated with the tracking device), and/or detect a location associated with the tracking device (e.g., a location of the first user community device at the time of the communication with the tracking device). This information can be used to provide updated locations and/or respond to a location request from tracking system server 100 regarding the tracking device. In some embodiments, the operations performed by the first community user device 104*a* can be hidden from first community user 105*a*. Accordingly, first community user device 104*a* can assist in locating the tracking device without bother and without the knowledge of first community user 105*a*.

Tracking system server 100 can assist user 103 in locating tracking device 106. The tracking device may be a chip, tile, tag, or other device for housing circuitry and that may be attached to or enclosed within an object, such as a wallet, keys, purse, car, or other object that the user may track. Additionally, the tracking device may include a speaker for emitting a sound and/or a transmitter for broadcasting a beacon. In one configuration, the tracking device may periodically transmit a beacon signal that may be detected using a nearby user device 102 and/or community user device 104. In some configurations, tracking device 106 may broadcast a beacon at regular intervals (e.g., one second intervals) that may be detected from a nearby user device (e.g., community user device 104*a*). The strength of the signal emitted from the tracking device may be used to determine a degree of proximity to user device 102 or community user device 104 that detects the signal. For example, a higher strength signal may indicate a close proximity between tracking device 106 and user device 102 and a lower strength signal may indicate a more remote proximity between tracking device 106 and user device 102, though in some embodiments, tracking device 106 may intentionally vary the transmission strength of the beacon signal. In some cases, the strength of signal or absence of a signal may be used to indicate that a tracking device is out-of-range or lost.

Figure 1A:
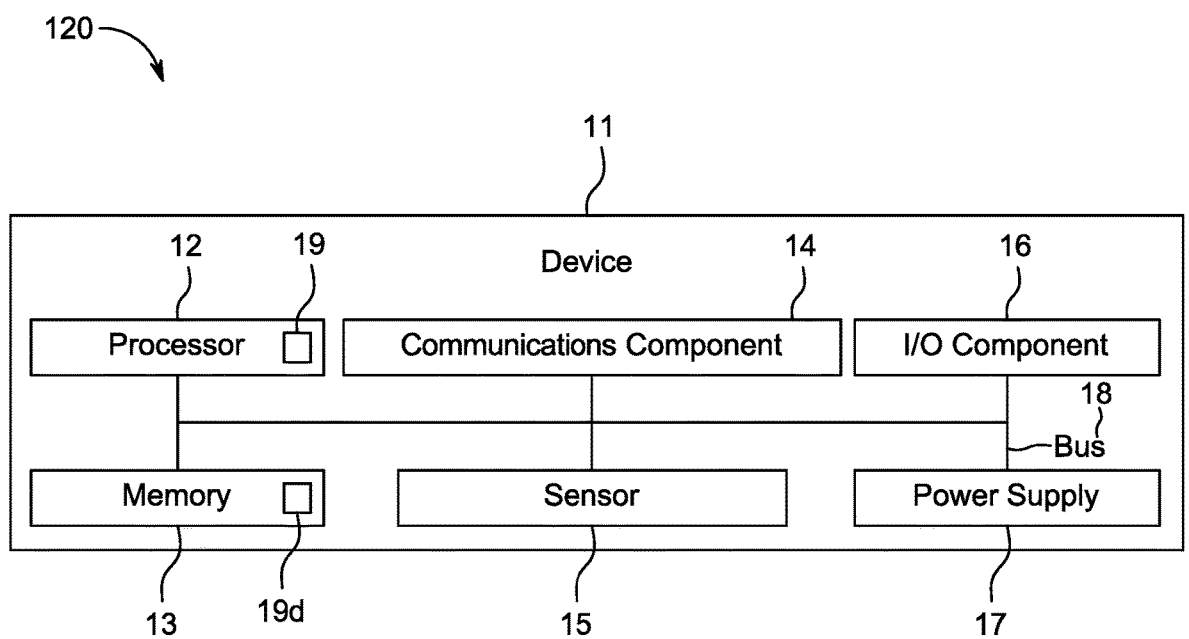
FIG. 1A is a more detailed schematic view of a system device of the system of FIG. 1.

As shown in FIG. 1A, a system device 120 (e.g., one, some, or each of servers/devices 100, 102, 102', 102*a*, 104*a*-104*n*, 106, and 112 of system 1 of FIG. 1) may include any suitable components or modules, including, but not limited to, a processor component 12, a memory component 13, a communications component 14, a sensor 15, an input/output ("I/O") component 16, a power supply component 17, a housing 11, and/or a bus 18 that may provide one or more wired or wireless communication links or paths for transferring data and/or power to, from, or between various other components of device 120. In some embodiments, one or more components of device 120 may be combined or omitted. Moreover, device 120 may include other components not combined or included in FIG. 1A and/or several instances of the components shown in FIG. 1A. For the sake of simplicity, only one of each of the components of device 120 is shown in FIG. 1A. I/O component 16 may include at least one input component (e.g., button, mouse, keyboard, etc.) to receive information from a user and/or at least one output component (e.g., audio speaker, video display, haptic component, etc.) to provide information to a user, such as a touch screen that may receive input information through a user's touch of a display screen and that may also provide visual information to a user via that same display screen. Memory 13 may include one or more storage mediums or media, including for example, a hard-drive, flash memory, permanent memory such as read-only memory ("ROM"), semi-permanent memory such as random access memory ("RAM"), any other suitable type of storage component, or any combination thereof (e.g., for storing data (e.g., unique user device identifier information, unique tracking device identifier information, unique user identifier information, tracking device coupling event data, tracking device decoupling event data, shared location/connection data, models, neural networks, algorithms, out of range ("OOR") application data, etc. (e.g., data 19*d*))). Communications component 14 may be provided to allow device 120 to communicate with one or more other devices 120 (e.g., any suitable communication via any suitable network (e.g., network 108, 110, etc. of system 1)) using any suitable communications protocol. Communications component 14 can be operative to create or connect to a communications network or link of a network. Communications component 14 can provide wireless communications using any suitable short-range or long-range communications protocol, such as Wi-Fi (e.g., an 802.11 protocol), Bluetooth, BLE, radio frequency systems (e.g., 1200 MHz, 2.4 GHz, and 5.6 GHz communication systems), ultra-wideband, near field communication ("NFC"), infrared, protocols used by wireless and cellular telephones and personal e-mail devices, or any other protocol supporting wireless communications. Communications component 14 can also be operative to connect to a wired communications link or directly to another data source wirelessly or via one or more wired connections. Communications component 14 may be a network interface that may include the mechanical, electrical, and/or signaling circuitry for communicating data over physical links that may be coupled to other devices of a network. Such network interface(s) may be configured to transmit and/or receive any suitable data using a variety of different communication protocols, including, but not limited to, TCP/IP, UDP, ATM, synchronous optical networks ("SONET"), any suitable wireless protocols, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access.

Sensor 15 may be any suitable sensor that may be configured to sense any suitable data for device 120 (e.g., location-based data via a global positioning system ("GPS") sensor system or any other suitable location determination protocol, motion data, environmental data, biometric data, etc.). Sensor 15 may be a sensor assembly that may include any suitable sensor or any suitable combination of sensors operative to detect movements of device 120 and/or of any user thereof and/or any other characteristics of device 120 and/or of its environment (e.g., physical activity or other characteristics of a user of device 120, light content of the device environment, gas pollution content of the device environment, noise pollution content of the device environment, altitude of the device, etc.). Sensor 15 may include any suitable sensor(s), including, but not limited to, one or more of a GPS sensor, wireless communication sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. Sensor 15 may include any suitable sensor components or subassemblies for detecting any suitable movement of device 120 and/or of a user thereof. For example, sensor 15 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor 15 may include one or more single-axis or two-axis acceleration motion sensors that may be operative to detect linear acceleration only along each of the x- or left/right direction and the y- or up/down direction, or along any other pair of directions. In some embodiments, sensor 15 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 15 may be operative to directly or indirectly detect rotation, rotational movement, angular displacement, tilt, position, orientation, motion along a non-linear (e.g., arcuate) path, or any other non-linear motions. Additionally or alternatively, sensor 15 may include one or more angular rate, inertial, and/or gyro-motion sensors or gyroscopes for detecting rotational movement. For example, sensor 15 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor 15 for detecting motion on device 120, such as any suitable pressure sensors, altimeters, or the like. Using sensor 15, device 120 may be configured to determine a velocity, acceleration, orientation, and/or any other suitable motion attribute of device 120. One or more biometric sensors may be multi-modal biometric sensors and/or operative to detect long-lived biometrics, modern liveness (e.g., active, passive, etc.) biometric detection, and/or the like. Sensor 15 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to device 120 for attempting to authenticate a user), line-in connector for data and/or power, and/or combinations thereof. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Device 120 can further include a timer that can be used, for example, to add time dimensions to various attributes of any detected element(s). Sensor 15 may include any suitable sensor components or subassemblies for detecting any suitable characteristics of any suitable condition of the lighting of the environment of device 120. For example, sensor 15 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of device 120 (e.g., in lux or lumens per square meter, etc.) and/or for determining the ambient color or white point chromaticity of ambient light in the environment of device 120 (e.g., in hue and colorfulness or in x/y parameters with respect to an x-y chromaticity space, etc.) and/or for determining the UV index or UV radiation in the environment of device 120 (e.g., in UV index units, etc.). Sensor 15 may include any suitable sensor components or subassemblies for detecting any suitable characteristics of any suitable condition of the air quality of the environment of device 120. For example, sensor 15 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of device 120 (e.g., in $O_2$% per liter, etc.) and/or for determining the air velocity of the ambient air in the environment of device 120 (e.g., in kilograms per second, etc.) and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of device 120 (e.g., in HG % per liter, etc.) and/or for determining the humidity of the ambient air in the environment of device 100 (e.g., in grams of water per cubic meter, etc. (e.g., using a hygrometer)) and/or for determining the temperature of the ambient air in the environment of device 120 (e.g., in degrees Celsius, etc. (e.g., using a thermometer)). Sensor 15 may include any suitable sensor components or subassemblies for detecting any suitable characteristics of any suitable condition of the sound quality of the environment of device 120. For example, sensor 15 may include any suitable sound quality sensor that may include, but is not limited to, one or more microphones or the like that may determine the level of sound pollution or noise in the environment of device 120 (e.g., in decibels, etc.). Sensor 15 may also include any other suitable sensor for determining any other suitable characteristics about a user of device 120 and/or the environment of device 120 and/or any situation within which device 120 may be existing. For example, any suitable clock and/or position sensor(s) may be provided to determine the current time and/or time zone within which device 120 may be located. Sensor 15 may be embedded in a body (e.g., housing 11) of device 120, such as along a bottom surface that may be operative to contact a user, or can be positioned at any other desirable location. In some examples, different sensors can be placed in different locations inside or on the surfaces of device 120 (e.g., some located inside housing 11 and some attached to an attachment mechanism (e.g., a wrist band coupled to a housing of a wearable device), or the like). In other examples, one or more sensors can be worn by a user separately as different parts of a single device 120 or as different devices. In such cases, the sensors can be configured to communicate with device 120 using a wired and/or wireless technology (e.g., via communications component 14). In some examples, sensors can be configured to communicate with each other and/or share data collected from one or more sensors.

Power supply 17 can include any suitable circuitry for receiving and/or generating power, and for providing such power to one or more of the other components of device 120. For example, power supply assembly 17 can be coupled to a power grid (e.g., when device 120 is not acting as a portable device or when a battery of the device is being charged at an electrical outlet with power generated by an electrical power plant). As another example, power supply assembly 17 may be configured to generate power from a natural source (e.g., solar power using solar cells). As another example, power supply assembly 17 can include one or more batteries for providing power (e.g., when device 120 is acting as a portable device). Device 120 may also be provided with a housing 11 that may at least partially enclose one or more of the components of device 120 for protection from debris and other degrading forces external to device 120. Each component of device 120 may be included in the same housing 11 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, device 120 may include other components not combined or included in those shown or several instances of the components shown.

Processor 12 may be used to run one or more applications, such as an application 19 that may be accessible from memory 13 (e.g., as a portion of data 19*d*) and/or any other suitable source (e.g., from any other device in its system). Application 19 may include, but is not limited to, one or more operating system applications, firmware applications, communication applications (e.g., for enabling communication of data between devices), third party service applications, internet browsing applications (e.g., for interacting with a website provided by a third party subsystem (e.g., a device 102 with a source 112)), application programming interfaces ("APIs"), software development kits ("SDKs"), tracking system applications (e.g., a web application or a native application for enabling a device 102/104 to interact with an online service or server(s) 100 and/or the like), any other suitable applications, and/or the like. For example, processor 12 may load an application 19 as an interface program to determine how instructions or data received via an input component of I/O component 16 or other component of device 120 (e.g., sensor 15 and/or communications component 14) may manipulate the way in which information may be stored (e.g., in memory 13) and/or provided to via an output component of I/O component 16 and/or to another system device via communications component 14. As one example, application 19 may be a third party application that may be running on device 120 (e.g., an application associated with the network of system 1 (e.g., server 100) and/or data source 112) that may be loaded on device 120 (e.g., using communications component 14) via an application market, such as the Apple App Store or Google Play, or that may be accessed via an internet application or web browser (e.g., by Apple Safari or Google Chrome) that may be running on device 120 and that may be pointed to a uniform resource locator ("URL") whose target or web resource may be managed by or otherwise affiliated with any suitable entity. Any device (e.g., any user device or tracking device or server) may include any suitable special purpose hardware (e.g., hardware support of high-speed packet processing, hardware support of machine learning algorithms, etc.). For example, an out of range ("OOR") algorithm or OOR process of a tracking application may be executed on a user device with respect to a decoupled tracking device (e.g., a mobile application with an OOR algorithm running on user device 102 in response to a decoupling of tracking device 106 from user device 102 being detected).

Device 120 may be any portable, mobile, wearable, implantable, or hand-held electronic device configured to operate with system 1. Alternatively, device 120 may not be portable during use, but may instead be generally stationary. Device 120 can include, but is not limited to, a media player, video player, still image player, game player, other media player, music recorder, movie or video camera or recorder, still camera, other media recorder, radio, medical equipment, domestic appliance, smart appliance (e.g., smart door knob, smart door lock, etc.), a tag, credit card-shaped device, transponder, transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device, boom box, modem, router, printer, kiosk, beacon, server, and any combinations thereof that may be useful as a user device or tracking device or system server or data source.

One or more tracking algorithms or processes may be provided for determining when to alert a user of a user device that a tracking device once communicatively coupled to the user device is now out of range or lost. For example, system 1 may be configured such that a user device, alone or in any suitable combination with a tracking system server and/or any other user device, may utilize an out of range ("OOR") algorithm whenever a tracking device is determined to be communicatively decoupled from the user device, where the OOR algorithm may be configured to trigger an OOR alert with the user device when the OOR algorithm determines that a confidence level threshold has been satisfied with respect to the tracking device being out of range of the user device (e.g., to notify a user of the user device that the tracking device has been left behind or lost).

Figure 2:
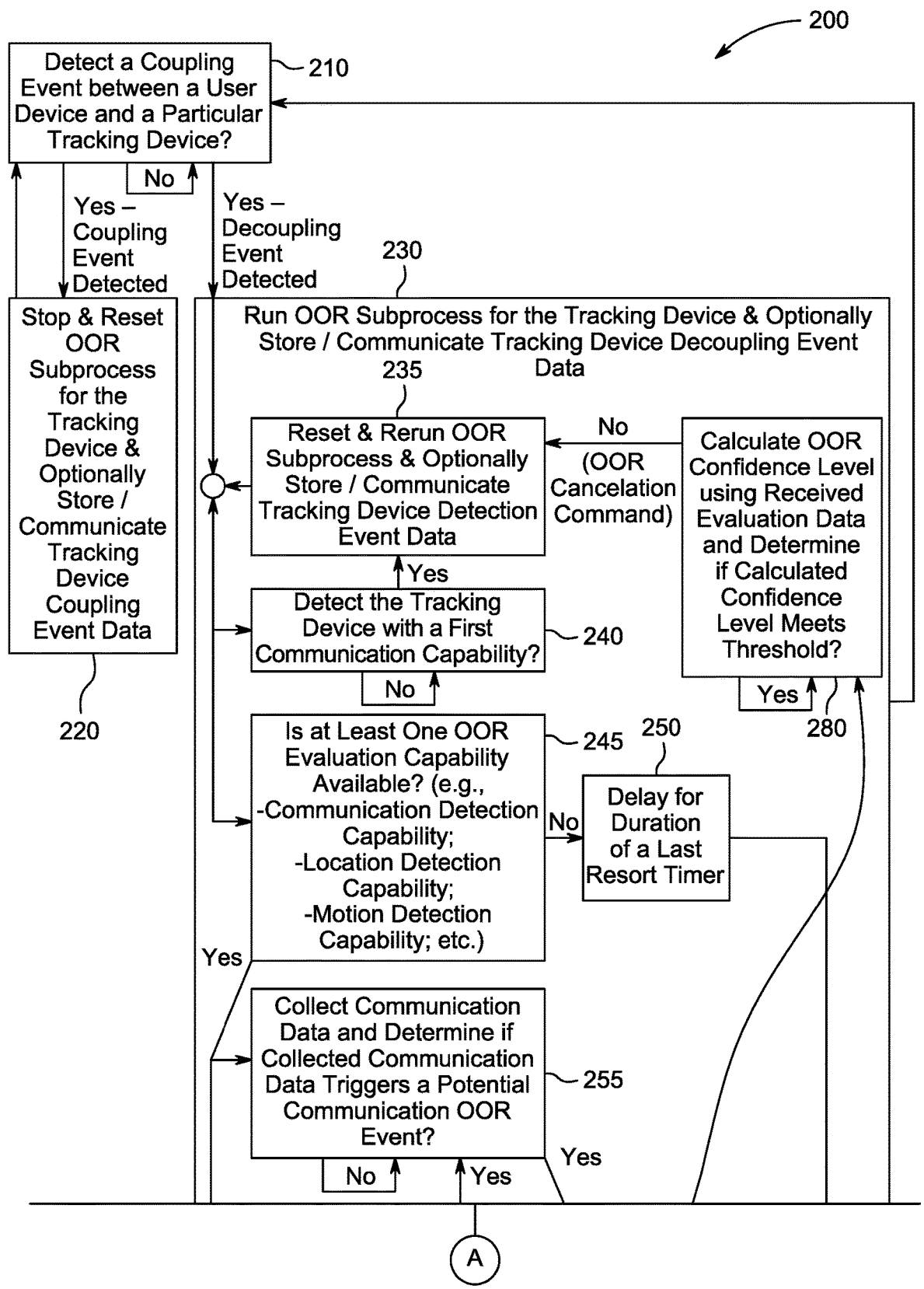
FIG. 2 illustrates a flowchart of an exemplary process for monitoring a tracking device according to some embodiments of the disclosure.
Figure 2:
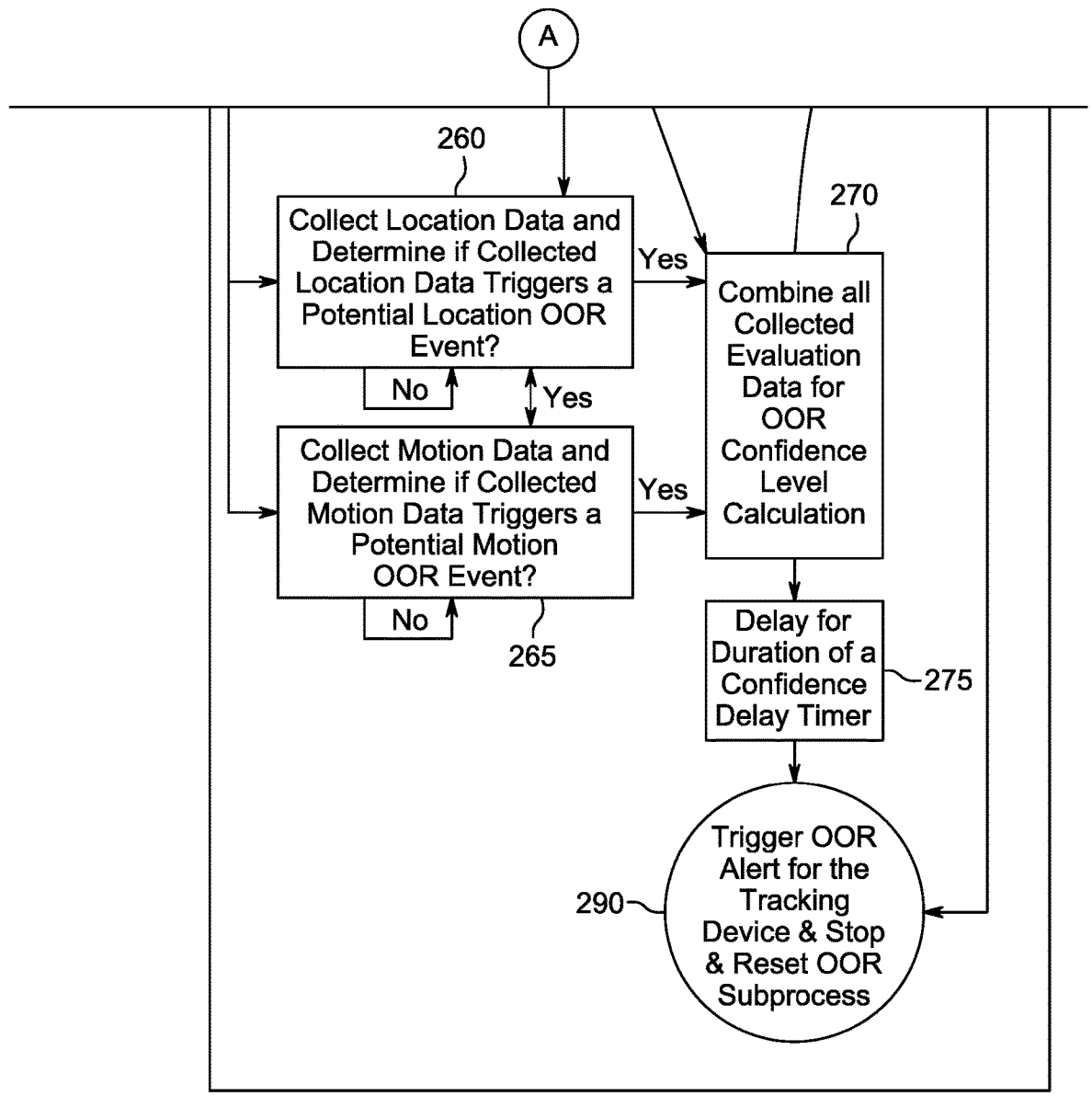

FIG. 2 is a flowchart of an illustrative process 200 for determining when to alert a user of a particular user device that a particular tracking device once communicatively coupled to the particular user device is now out of range or lost (e.g., that tracking device 106 is out of range from user device 102). At operation 210, the user device may periodically attempt to detect whether or not a coupling event has occurred between the particular user device and the particular tracking device. If it is determined by the user device at operation 210 that a coupling event between the user device and the tracking device has been detected (e.g., that user device 102 has been communicatively coupled to tracking device 106 via network 110), then process 200 may proceed from operation 210 to an operation 220, at which the user device may stop and reset any OOR algorithm or OOR subprocess that may have been running on the user device for that communicatively coupled tracking device (e.g., such an algorithm/subprocess may not be running for certain tracking devices (e.g., a user may not care to do so for its office keys during the weekend)), optionally store on the user device and/or communicate to a tracking system server (e.g., server 100 via network 108) any suitable tracking device coupling event data, such as data indicative of the time at which the coupling event was detected and/or data indicative of the location of the user device at the time of the coupling event and/or radio signal strength and/or a determined distance between the user device and the tracking device and/or any suitable sensor data (e.g., motion and/or other sensor data from any suitable sensor of the user device) and/or the like, and return from operation 220 to operation 210. Alternatively, if it is determined by the user device at operation 210 that no coupling event between the user device and the tracking device has been detected (e.g., that user device 102 has not been communicatively coupled to tracking device 106 via network 110 and that user device 102 has not been communicatively decoupled from tracking device 106 via network 110), then process 200 may simply remain at operation 210 and await the next periodic instance of operation 210. Alternatively, if it is determined by the user device at operation 210 that a decoupling event between the user device and the tracking device has been detected (e.g., that user device 102 has been communicatively decoupled from tracking device 106 via network 110), then process 200 may proceed from operation 210 to an operation 230, at which the user device may run (e.g., begin to execute) an OOR algorithm or OOR subprocess for that communicatively decoupled tracking device, optionally store on the user device and/or communicate to a tracking system server (e.g., server 100 via network 108) any suitable tracking device decoupling event data, such as data indicative of the time at which the decoupling event was detected and/or data indicative of the location of the user device at the time of the decoupling event and/or radio signal strength (e.g., last available signal strength) and/or a determined distance between the user device and the tracking device (e.g., last available measured distance between the user device and the tracking device (e.g., using UWB and/or BT strength and/or any suitable technology to determine a distance)) and/or any suitable sensor data (e.g., motion data and/or other sensor data from any suitable sensor of the user device) and/or the like, and return from operation 230 to operation 210. The periodicity or frequency at which operation 210 may be run by the user device for detecting a coupling/decoupling event between the user device and a particular tracking device may be any suitable value (e.g., in a range between every 10 milliseconds and every 10 seconds), where the frequency may vary based on any suitable event or characteristic, such as a first frequency may be used when the user and tracking devices are currently coupled and a second frequency may be used when the user and tracking devices are currently decoupled. In some embodiments, the system may be event-based and the operating system may trigger events for this process such that, in that sense, there are no intervals. Coupling and decoupling events may be triggered by any method determining the presence of the tracking device by the user device. For example a coupling event may be triggered by a BLE connected event, BLE signal detection, region enter (e.g., but not limited to with the use of iBeacon protocol and region monitoring on an iOS powered user device), UWB signal detection, and/or the like. For example, a decoupling event may be triggered by a BLE disconnected event, a BLE signal detection timeout (e.g., if a tracking device BLE signal is not seen by a user device for a certain period of time), region exit (e.g., but not limited to with the use of iBeacon protocol and region monitoring on an iOS powered user device), UWB signal loss, and/or the like.

During operation 230, one or more various suboperations may be performed as the OOR algorithm or OOR subprocess is executed for the particular tracking device whose decoupling event has been detected. Such an OOR algorithm or OOR subprocess of operation 230 may be described with respect to suboperations or OOR operations that may be carried out by the user device (e.g., a processor and/or any other suitable components of user device 102) alone and/or in conjunction with one or more auxiliary entities, such as a tracking system server (e.g., server 100) and/or one or more additional user devices (e.g., one or more of devices 102a, 104a-104n, etc.).

The OOR algorithm or OOR subprocess of operation 230 may be used to inform a user of the user device (e.g., user 103 of user device 102) when the user distanced itself and the user device from the tracking device and its associated tracked item by triggering an OOR alert event that may notify the user about the situation (e.g., through any suitable notification using any suitable output component of the user device and/or using any suitable output component of the tracking device and/or using a communication of the system (e.g., by sending the user an e-mail or text message or otherwise)).

The OOR algorithm or OOR subprocess of operation 230 may combine any suitable available technologies on the user device, such as a first communication capability (e.g., BLE, UWB, etc. (e.g., as may be used to communicatively couple the user device to the tracking device (e.g., via network 110)), a second communication capability (e.g., Wi-Fi (e.g., as may be used to communicatively couple the user device to any suitable other devices (e.g., server 100, source 112, etc.)), geolocation, motion sensors, motion activity data, and/or any other suitable capabilities of the user device.

The OOR algorithm or OOR subprocess of operation 230 may run partly on the user device and partly on a web server (e.g., server 100) for higher accuracy calculation of a potential OOR event. Alternatively, the OOR algorithm or OOR subprocess of operation 230 may run entirely on the user device (e.g., one, some, or all processes described herein as potentially carried out by a system server may instead be carried out on the user device), although the user device may perhaps rely on some data provided by a system server or other remote entity in order to enable the user device to effectively and efficiently carry out the processing during the OOR algorithm.

As shown in FIG. 2, after a decoupling event has been detected at operation 210 for the tracking device (e.g., after tracking device 106 loses connection via network 110 with user device 102), the OOR algorithm or OOR subprocess of operation 230 may be run by process 200. However, as shown, if at any time during the OOR algorithm execution at operation 230, a coupling event between the tracking device and the user device is detected at operation 210 (e.g., if tracking device 106 reconnects via network 110 with user device 102), then the OOR algorithm or OOR subprocess being run by operation 230 may be stopped and reset at operation 220 (e.g., the execution of the OOR algorithm or OOR subprocess of operation 230 may be reset and stopped while the system waits for the tracking device to be once again communicatively decoupled from the user device).

During the execution of the OOR algorithm or OOR subprocess of operation 230, process 200 may include suboperations 240 and 245. At suboperation 240, the user device may periodically determine whether the tracking device is detectable by a first communication capability of the user device (e.g., the communication capability that enables a detectable coupling event at operation 210 and/or a detectable decoupling event at operation 210). For example, the user device may periodically check at suboperation 240 if the tracking device is nearby the user device using a communication capability of the user device (e.g., using a BLE scanner of the user device if BLE may be the technique used (e.g., by network 110) to communicatively couple user device 102 to tracking device 106)). If it is determined by the user device at suboperation 240 that the tracking device has been detected by the first communication capability (e.g., that a communications component of user device 102 has detected the presence of tracking device 106 via network 110), then operation 230 of process 200 may proceed from suboperation 240 to a suboperation 235, at which the user device may reset the current OOR algorithm or OOR subprocess running on the user device for that communicatively coupled tracking device, optionally store on the user device and/or communicate to a tracking system server (e.g., server 100 via network 108) any suitable tracking device detection event data, such as data indicative of the time at which the tracking device was detected and/or data indicative of the location of the user device at the time of the detection event and/or radio signal strength and/or a determined distance between the user device and the tracking device and/or any suitable sensor data (e.g., motion and/or other sensor data from any suitable sensor of the user device) and/or the like, and return from suboperation 235 to the beginning of operation 230 (e.g., to suboperations 240 and 245). Alternatively, if it is determined by the user device at suboperation 240 that the tracking device has not been detected by the first communication capability (e.g., that a communications component of user device 102 has not detected the presence of tracking device 106 via network 110), then operation 230 of process 200 may simply remain at suboperation 240 and await the next periodic instance of suboperation 240. The periodicity or frequency at which suboperation 240 may be run by the user device for detecting the tracking device may be any suitable value (e.g., in a range between every 10 milliseconds and every 60 seconds), where the frequency may vary based on any suitable event(s) or characteristic(s). Therefore, for example, if the user device detects the presence of (e.g., "sees") the tracking device nearby at suboperation 240 but the user device is unable to reconnect or otherwise communicatively couple to the tracking device (e.g., due to the tracking device being at a BLE range limit distance or due to a handshake procedure between the tracking device and user device not succeeding), the current OOR algorithm or OOR subprocess of operation 230 may be reset but may remain running.

Moreover, during the execution of the OOR algorithm or OOR subprocess of operation 230 (e.g., simultaneously with or time-multiplexed with suboperation 240), at suboperation 245, the user device may determine whether at least one OOR evaluation capability of any suitable group of OOR evaluation capabilities is currently available to the user device. Such a group of OOR evaluation capabilities may include, but is not limited to, a communication detection capability (e.g., Wi-Fi detection), a location detection capability (e.g., geolocation, GPS, etc.), a motion detection capability (e.g., motion check, motion type, etc.), and/or the like. If no OOR evaluation capability is determined to be available to the user device, then operation 230 of process 200 may proceed from suboperation 245 to a suboperation 250, at which the user device may delay for the duration of any suitable timer, which may be referred to herein as a last resort timer, before proceeding from suboperation 250 to a suboperation 290, at which an OOR alert for the tracking device may be triggered for presentation to a user of the user device. The duration of such a last resort timer of suboperation 250 may be any suitable duration (e.g., 20 seconds, or any duration in a range between 10 seconds and 300 seconds, etc.) that may be operative to delay the triggering of an OOR alert for enabling the possibility of detection of the tracking device at one or more periodic instances of suboperation 240 of operation 230 of process 200 and/or for enabling the possibility of detection of a coupling event of the tracking device at one or more periodic instances of operation 210 of process 200. The length of the last resort timer may vary based on any suitable characteristic(s), including, but not limited to, the type of user device (e.g., a first OS type user device may have a longer last resort timer than a second OS type user device if the first OS type user device is determined to have more reconnect issues than the second OS type user device), the type of tracking device, the type of network previously communicatively coupling the user device to the tracking device (e.g., type of network 110), and/or the like. The length of the last resort timer may vary between instances of suboperation 250 of operation 230. For example, if during a first iteration of suboperation 250, the length of the last resort timer was X, but then the OOR subprocess was reset at suboperation 235 during that duration X due to the tracking device being detected at suboperation 240, then the next iteration of suboperation 250 may set the length of the last resort timer to be 1.05 X or any other suitable magnitude of the previous duration X, whereby the duration of the last resort timer may be extended each time or after a certain amount of times that the tracking device is detected at suboperation 240 during an iteration of operation 230. Therefore, if no OOR evaluation capability is determined at suboperation 245 to be available to the user device during the current execution of the OOR subprocess of operation 230, then a timer of suboperation 250 may be used to trigger the OOR alert event (e.g., suboperation 250 may start a timer of last resort and may be used to advance operation 230 to trigger the OOR alert event at suboperation 290 if the timer of last resort expires).

However, if any or at least one OOR evaluation capability is determined at suboperation 245 to be available to the user device during the current execution of the OOR subprocess of operation 230, then operation 230 may proceed from suboperation 245 to a respective one or more OOR evaluation capability suboperations (e.g., one or more of OOR evaluation suboperations 255, 260, and 265). For example, during operation 230, any two or all three OOR evaluation capability suboperations or evaluation branches 255, 260, and 265 may run in parallel (e.g., depending on availability of technology or data related to each branch). One, some, or each branch may be available to the user device executing the OOR algorithm or OOR subprocess of operation 230. Each available branch may be configured to gather data related to the OOR evaluation capability of that branch for determining whether or not to potentially trigger the OOR alert event.

If any of the evaluation branches gathers data that may be determined by that evaluation branch to be indicative of a situation in which the OOR alert event ought to be triggered (e.g., if any evaluation branch triggers a potential OOR event), then all data gathered from each available evaluation branch (e.g., one, some, or each of suboperations 255, 260, and 265) may be combined at a suboperation 270 and then used for further evaluation or for higher accuracy OOR event calculation and/or OOR event confidence level calculation at a suboperation 280, which may be carried out by the user device, by a remote entity (e.g., tracking system server 100), and/or any combination thereof. After the gathered evaluation branch data from all available evaluation branches has been combined at suboperation 270, in addition to calculating an OOR event confidence level at suboperation 280 for that combined evaluation branch data, operation 230 of process 200 may also proceed from suboperation 270 to a suboperation 275, at which the user device may delay for the duration of any suitable timer, which may be referred to herein as a confidence delay timer, before proceeding from suboperation 275 to suboperation 290, at which an OOR alert for the tracking device may be triggered for presentation to a user of the user device. The duration of such a confidence delay timer of suboperation 275 may be any suitable duration (e.g., 15 seconds, or any duration in a range between 10 seconds and 45 seconds, etc.) that may be operative to delay the triggering of an OOR alert for enabling the calculation of an OOR event confidence level based on any evaluation branch data at suboperation 280 of operation 230 of process 200 and/or for enabling the possibility of detection of the tracking device at one or more periodic instances of suboperation 240 of operation 230 of process 200 and/or for enabling the possibility of detection of a coupling event of the tracking device at one or more periodic instances of operation 210 of process 200. Therefore, if evaluation branch data is gathered and determined by any evaluation branch to be indicative of a situation in which an OOR alert event ought to be triggered (e.g., triggers a potential OOR event) and is then combined with any additional evaluation branch data for use in calculating an OOR event confidence level (e.g., at one or more of suboperations 255, 260, and 265 and suboperation 270), then a timer of suboperation 275 may be used to trigger the OOR alert event (e.g., suboperation 275 may start a timer of confidence delay and may be used to advance operation 230 to trigger the OOR alert event at suboperation 290 if the timer of confidence delay expires). If, after any evaluation branch data has already been collected (e.g., at suboperation 270) for calculating an OOR event confidence level (e.g., at suboperation 280) as a result of any evaluation branch triggering a potential OOR event (e.g., at any one of suboperations 255, 260, and 265) and after the delay of a confidence delay timer has been appropriately initiated (e.g., at suboperation 275) but not yet expired, any (e.g., any other) evaluation branch triggers a potential OOR event (e.g., at any one of suboperations 255, 260, and 265), then all data gathered from each available evaluation branch (e.g., one, some, or each of suboperations 255, 260, and 265) that has not yet been combined may be combined at another iteration of suboperation 270 and then used at suboperation 280 for calculating an OOR event confidence level in combination with the previously combined evaluation branch data, while operation 230 may also proceed to suboperation 275 for restarting the confidence delay timer. Therefore, when another branch also triggers a potential OOR event, the additional evaluation branch data may be used for (re-)calculating an OOR event confidence level in combination with the previously gathered evaluation branch data. Thus, if one or more evaluation branches of the OOR algorithm or OOR subprocess of operation 230 are not available (e.g., due to the user device not supporting the motion activity or not having the integrated motion sensors, and/or not being connected to Wi-Fi, and/or not having permissions to use the resources needed in that branch (e.g., geolocation, Wi-Fi, etc.)), then operation 230 may be configured to use the evaluation branch(es) it does have available on a best effort basis. The more OOR evaluation branches that may be available to the OOR algorithm or OOR subprocess of operation 230, the stronger the OOR algorithm/subprocess may be and the more data may be used for calculating an OOR event confidence level. Of course, as mentioned, if none of the OOR evaluation capabilities are determined to be available such that none of the evaluation branches can be used, operation 230 may instead use a timer of last resort at suboperation 250 to trigger an OOR alert (e.g., operation 230 may advance from suboperation 245 to suboperation 250 to start a timer of last resort and trigger an OOR alert event at suboperation 290 if the timer of last resort expires).

As just one example, one OOR evaluation capability of operation 230 may be a communication detection OOR evaluation capability, and if such an evaluation capability is determined to be available to the user device at suboperation 245, then operation 230 may proceed from suboperation 245 to at least a communication detection OOR evaluation capability suboperation 255. For example, a particular communication type may be associated with the communication detection capability determination of suboperations 245 and 255, such as a Wi-Fi communication protocol, although any other suitable additional or alternative communication protocol (e.g., any local area network communication type, such as Zigbee, etc.) could be the communication type associated with suboperation 245 and the branch of suboperation 255 and/or any other OOR evaluation suboperation branch. Continuing with the example of Wi-Fi being associated with the communication detection capability of suboperations 245 and 255, suboperation 245 may be operative to make any suitable determination with respect to the configuration of the user device with respect to a Wi-Fi communication capability in order to enable advancement from suboperation 245 to suboperation 255 (e.g., to determine that the communication detection OOR evaluation capability is available), including, but not limited to, determining that the user device has its Wi-Fi communication circuitry enabled for making/maintaining a Wi-Fi communicative coupling with another device, determining that the user device has an active Wi-Fi communicative coupling with another device (e.g., a Wi-Fi router, etc.), and/or the like. Communication detection OOR evaluation capability suboperation 255 may be utilized if the user device has the particular communication functionality turned on but regardless of whether or not the user device has an active connection using that particular communication functionality. Alternatively, in some embodiments, communication detection OOR evaluation capability suboperation 255 may be utilized even if the user device has the particular communication functionality turned off (e.g., even if the Wi-Fi communication circuitry (e.g., Wi-Fi antenna) is turned off). Once it is determined that a communication detection OOR evaluation capability is available at suboperation 245 such that operation 230 may advance at least from suboperation 245 to suboperation 255, suboperation 255 may be operative to collect any suitable communication detection OOR evaluation data and determine if the collected communication detection OOR evaluation data triggers a potential communication OOR event. The communication detection OOR evaluation data that may be collected at suboperation 255 may include any suitable data related to the user device and its communication according to the communication protocol(s) of interest (e.g., Wi-Fi), including, but not limited to, any or all connect/disconnect event data between the user device and any other device(s) via the communication protocol(s) of interest (e.g., coupled/decoupled device type, coupled/decoupled device identifier, relationship of coupled/decoupled device to the user device and/or its user (e.g., user's home Wi-Fi network, user's office Wi-Fi network, etc.), timestamp of coupling/decoupling event, etc.), strength of any signal between the user device and another device coupled using the communication protocol(s) of interest, service set ID ("SSID"), basic service set identifier ("BSSID"), and/or the like. It is to be understood that such communication detection OOR evaluation data that may be collected at suboperation 255 may include data related to the user device and its communication according to the communication protocol(s) of interest (e.g., Wi-Fi) that may have occurred prior to sub operation 255 (e.g., data indicative of a Wi-Fi coupling event or a Wi-Fi decoupling event that may have occurred prior to operation 230 (e.g., prior to a decoupling event between the user device and the tracking device as detected at operation 210 or otherwise), such as a Wi-Fi decoupling event between the user device and a Wi-Fi network that occurred within a certain amount of time (e.g., in a range of 15-120 seconds) of (e.g., prior to) the initiation of suboperation 255 (e.g., a Wi-Fi drop event at the user device within any suitable time frame prior to a tracking device decoupling event being detected at operation 210 for transitioning to operation 230, as a Wi-Fi drop within a certain amount of time (e.g., in a range of 15-120 seconds) of the tracking device decoupling event may likely be related to one another (e.g., a user moving the user device away from the tracking device and a Wi-Fi network))). Any suitable collected communication detection OOR evaluation data may be configured to trigger a potential communication OOR event for advancing operation 230 from suboperation 255 to suboperation 270. For example, a potential communication OOR event may be triggered at suboperation 255 if communication detection OOR evaluation data collected at suboperation 255 is determined to be indicative of a Wi-Fi decoupling event by the user device within any suitable amount of time (e.g., in a range of 15-120 seconds) before or any time after the decoupling event between the user device and the relevant tracking device that may have initiated the transition between operation 210 and 230. Suboperation 255 may be operative to check for a Wi-Fi decoupling event at any suitable frequency (e.g., every 5 seconds, every 10 seconds, every 30 seconds, etc., which may dynamically change over the duration of operation 230 and/or be based on an operating system of the user device and/or the like). Suboperation 255 may be periodically or otherwise repeated throughout operation 230 and may advance from suboperation 255 to operation 270 if/when a potential communication OOR event may be triggered.

Additionally or alternatively, one OOR evaluation capability of operation 230 may be a location detection OOR evaluation capability, and if such an evaluation capability is determined to be available to the user device at suboperation 245, then operation 230 may proceed from suboperation 245 to at least a location detection OOR evaluation capability suboperation 260. For example, any particular location detection type(s) may be associated with the location detection capability determination of suboperations 245 and 260, such as a GPS location determination protocol, although any other suitable additional or alternative location detection protocol could be associated with suboperation 245 and the branch of suboperation 260 and/or any other OOR evaluation suboperation branch. Suboperation 245 may be operative to make any suitable determination with respect to the configuration of the user device with respect to a location detection capability in order to enable advancement from suboperation 245 to suboperation 260 (e.g., to determine that the location detection OOR evaluation capability is available), including, but not limited to, determining that the user device has its GPS circuitry or other suitable circuitry enabled for determining an accurate location of the user device, determining that the user device has an active and robust communicative coupling with another device (e.g., a GPS satellite, etc.), determining that the user device's location may be determined based on cellular triangulation, determining that the user device's location may be determined based on Wi-Fi network data, determining that the user device's location may be determined based on indoor location data, determining that the user device's location may be determined based on stationary BLE and/or UWB beacons, and/or the like. Once it is determined that a location detection OOR evaluation capability is available at suboperation 245 such that operation 230 may advance at least from suboperation 245 to suboperation 260, suboperation 260 may be operative to collect any suitable location detection OOR evaluation data and determine if the collected location detection OOR evaluation data triggers a potential location OOR event. The location detection OOR evaluation data that may be collected at suboperation 260 may include any suitable data related to the user device and its location, including, but not limited to, any or all detected user device location data, timestamp of any or all detected user device location data, accuracy information associated with the accuracy of any or all detected user device location data, and/or the like. It is to be understood that such location detection OOR evaluation data that may be collected at suboperation 260 may include data related to the location of the user device that may have been detected prior to suboperation 260 (e.g., data indicative of a location of the user device that may have been determined prior to operation 230 (e.g., prior to a decoupling event between the user device and the tracking device as detected at operation 210 or otherwise), such as the detected location of the user device within 15 seconds of (e.g., prior to) the initiation of suboperation 260 (e.g., a user device location as detected within any suitable time frame prior to a tracking device decoupling event being detected at operation 210 for transitioning to operation 230, as a detected user device location within 15 seconds of the tracking device decoupling event may likely be related to one another)). Any suitable collected location detection OOR evaluation data may be configured to trigger a potential location OOR event for advancing operation 230 from suboperation 260 to suboperation 270. For example, a potential location OOR event may be triggered at suboperation 260 if the distance between consecutive detected locations is greater than any suitable distance threshold, or, particularly if the location detection OOR evaluation data collected at suboperation 260 is determined to be indicative of a threshold change in user device location (e.g., location change outside a radius threshold) between the most recently detected user device location and the user device location at the time of the decoupling event between the user device and the relevant tracking device that may have initiated the transition between operation 210 and 230, where such a threshold change or threshold radius (e.g., threshold magnitude of the difference between the two locations (e.g., in feet, meters, etc.)) may be any suitable magnitude (e.g., 100 meters, 1 kilometer, etc.) and/or defined based on any suitable characteristics, including, but not limited to, the frequency with which the user device location may be determined/updated, the accuracy of the determined user device location, the location type of the user device location at the time of the decoupling event (e.g., user's home, user's office, non-user-specific location, etc.), distance over time, and/or the like. The distance threshold may be adjusted dynamically (e.g., based on the accuracy of the location detection (e.g., based on the accuracy of a location signal (e.g., GPS signal vs. BLE location signal, etc.))) and/or based on the type of tracking device (e.g., based on the type of article associated with/coupled to the tracking device (e.g., wallet vs. jacket)) and/or the like. Suboperation 260 may be operative to check for a location of the user device at any suitable frequency (e.g., every 5 seconds, every 10 seconds, every 30 seconds, etc., which may dynamically change over the duration of operation 230 and/or be based on an operating system of the user device and/or on any detected motion of the user device (see, e.g., suboperation 265 (e.g., for conserving processing power)) and/or on the difference between consecutive detected locations and/or the like). Suboperation 260 may be periodically or otherwise repeated throughout operation 230 and may advance from suboperation 260 to operation 270 if/when a potential location OOR event may be triggered.

Additionally or alternatively, one OOR evaluation capability of operation 230 may be a motion detection OOR evaluation capability, and if such an evaluation capability is determined to be available to the user device at suboperation 245, then operation 230 may proceed from suboperation 245 to at least a motion detection OOR evaluation capability suboperation 265. For example, any particular motion detection type(s) may be associated with the motion detection capability determination of suboperations 245 and 265, such as gyroscope data, accelerometer data, step data, and/or the like, although any other suitable additional or alternative motion detection protocol(s) could be associated with suboperation 245 and the branch of suboperation 265 and/or any other OOR evaluation suboperation branch. Suboperation 245 may be operative to make any suitable determination with respect to the configuration of the user device with respect to a motion detection capability in order to enable advancement from suboperation 245 to suboperation 265 (e.g., to determine that the motion detection OOR evaluation capability is available), including, but not limited to, determining that the user device has its motion circuitry enabled for determining an accurate motion of the user device, and/or the like. Once it is determined that a motion detection OOR evaluation capability is available at suboperation 245 such that operation 230 may advance at least from suboperation 245 to suboperation 265, suboperation 265 may be operative to collect any suitable motion detection OOR evaluation data and determine if the collected motion detection OOR evaluation data triggers a potential motion OOR event. The motion detection OOR evaluation data that may be collected at suboperation 265 may include any suitable data related to the user device and its motion (e.g., motion in free space (e.g., in any of six degrees of freedom or nine degrees of freedom with compass information), such as absolute orientation with inertial measurement unit ("IMU")/compass), including, but not limited to, any or all detected user device motion data, type of motion detected (e.g., shake, lift, drop, rotate, in vehicle, walking, running, motionless, cycling, etc.), motion alerts, raw sensor data, timestamp (beginning/end) and duration of motion of any or all detected user device motion data, accuracy information associated with the accuracy of any or all detected user device motion data, and/or the like. It is to be understood that such motion detection OOR evaluation data that may be collected at suboperation 265 may include data related to the motion of the user device that may have been detected prior to suboperation 265 (e.g., data indicative of a motion of the user device that may have been determined prior to operation 230 (e.g., prior to a decoupling event between the user device and the tracking device as detected at operation 210 or otherwise), such as the detected motion of the user device within 120 seconds of (e.g., prior to) the initiation of suboperation 265 (e.g., a user device motion as detected within any suitable time frame prior to a tracking device decoupling event being detected at operation 210 for transitioning to operation 230, as a detected user device motion within 120 seconds of the tracking device decoupling event may likely be related to one another)). Any suitable collected location detection OOR evaluation data may be configured to trigger a potential motion OOR event for advancing operation 230 from suboperation 265 to suboperation 270. For example, a potential motion OOR event may be triggered at suboperation 265 if a certain amount of motion is detected within a certain amount of time (e.g., at least 100 steps within 3 minutes) or if a certain motion is constant for a certain amount of time, where such motion and/or time frame may or may not be related to the decoupling event of the tracking device (e.g., decoupling event within the time frame within which the threshold amount of motion was detected). As another example, a potential motion OOR event may be triggered at suboperation 265 if a certain sequence of motion types is detected with a certain relationship to the tracking device decoupling event (e.g., a detected sequence of in vehicle then motionless then walking, where the sequence is over a period of time in which the decoupling event is detected (e.g., user left device in vehicle) or might not be detected). Suboperation 265 may be operative to check for a motion of the user device at any suitable frequency (e.g., every 5 seconds, every 10 seconds, every 30 seconds, etc., which may dynamically change over the duration of operation 230 and/or be based on an operating system of the user device and/or on the difference between consecutive detected motions and/or the like). Suboperation 265 may be periodically or otherwise repeated throughout operation 230 and may advance from suboperation 265 to operation 270 if/when a potential motion OOR event may be triggered.

When any available branch collects evaluation data that is operative to trigger a potential OOR event of that branch (e.g., any one of the branches of suboperations 255, 260, and 265), all evaluation data collected by all available branches (e.g., each one of the branches of suboperations 255, 260, and 265) may be combined at suboperation 270 for use in calculating an OOR confidence level at suboperation 280. Each available branch suboperation may continue to collect its respective evaluation data even after it or any other available branch suboperation may have triggered its potential OOR event. Each available branch suboperation may run in parallel to one another, even after operation 230 may advance to suboperation 270 in response to one of the running branch suboperations triggering its potential OOR event. Any time any running branch suboperation may trigger its potential OOR event, operation 230 may advance to suboperation 270 for combining all evaluation data collected by all available branches (e.g., since the last iteration of suboperation 270) and may then advance to not only suboperation 275 for restarting a delay of a confidence delay timer duration but also to suboperation 280 for calculating an OOR event confidence level based on any/all combined evaluation data. Therefore, if at any time during the duration of a confidence delay timer started at one instance of suboperation 275, any running branch suboperation triggers its potential OOR event (e.g., at one of suboperations 255, 260, and 265), then another instance of suboperation 275 may occur in which the duration of the confidence delay timer may be reset/restarted, while all collected evaluation data from all available branches may be made available at suboperation 270 for use in calculating an OOR confidence level at suboperation 280.

At suboperation 280, any provided evaluation data (e.g., as collected at one or more available branch suboperations 255, 260, and 265 and combined or otherwise made available at suboperation 270) may be used to calculate an OOR confidence level. At suboperation 280, an OOR confidence level may be calculated based on any suitable data, including at least a portion or all of the collected evaluation data made available at suboperation 270, and if that calculated OOR confidence level is determined at suboperation 280 not to meet any suitable threshold (e.g., determined not to be at least a certain confidence level), then operation 230 may advance from suboperation 280 to suboperation 235, at which the user device may reset the current OOR algorithm or OOR subprocess running on the user device for that communicatively coupled tracking device, and return from suboperation 235 to the beginning of operation 230 (e.g., to suboperations 240 and 245). However, if, at suboperation 280, a calculated OOR confidence level is determined to meet any suitable threshold (e.g., determined to be at least a certain confidence level), then operation 230 may not advance to suboperation 235 but instead may either (i) wait for the duration of the confidence delay timer running at suboperation 275 to expire (e.g., such that operation 230 may advance from suboperation 275 to suboperation 290 for triggering an OOR alert and stopping/resetting the OOR subprocess) or (ii) detect a running branch suboperation triggering its potential OOR event before the duration of the confidence delay timer running at suboperation 275 expires such that the confidence delay timer may be reset at a new instance of suboperation 275 or (iii) detect the tracking device at suboperation 240 before the duration of the confidence delay timer running at suboperation 275 expires or (iv) detect a tracking device coupling event at operation 210 before the duration of the confidence delay timer running at suboperation 275 expires. Any time a running OOR subprocess of operation 230 is reset (e.g., at suboperation 235 and/or at operation 220), any running timer of the OOR subprocess (e.g., last resort timer or confidence delay timer) may be stopped and reset and/or any detection capability evaluation data collected at each of the branch suboperations may be cleared. Each OOR confidence level calculation request that may be generated at suboperation 270 may include a unique request identifier that may also be included in any data that may be generated at suboperation 280 if the calculated confidence level does not meet the threshold, such that if operation 230 attempts to transition from suboperation 280 to suboperation 235 due to a calculated OOR confidence level not meeting a threshold for a first OOR confidence level calculation request associated with a first unique request identifier, that first unique request identifier may be identified by the attempted transition (e.g., by the user device at suboperation 235) and may only enable completion of that transition for resetting the OOR subprocess if that identified first unique request identifier is the most recent unique request identifier. This may prevent an outdated OOR confidence level calculation to dictate a reset of the OOR subprocess. For example, if after a first iteration of suboperation 270 where a first unique request identifier is included with a first OOR confidence level calculation request (e.g., after a first branch's potential OOR event is triggered) but before an OOR confidence level is calculated and determined not to meet a threshold at suboperation 280 for triggering a reset at suboperation 235, a second iteration of suboperation 270 occurs where a second unique request identifier may be included with a second OOR confidence level calculation request (e.g., after a second branch's potential OOR event is triggered), the user device may be configured to reset the subprocess in response to an indication from suboperation 280 that the OOR confidence level that meets the threshold was calculated in response to the ripe/relevant second OOR confidence level calculation request with the second unique request identifier but not in response to any outdated first OOR confidence level calculation request with the second unique request identifier (e.g., such that an earlier outdated OOR confidence level calculation request may not result in resetting the OOR subprocess). Therefore, even if suboperation 280 may be at least partially carried out by an entity remote from the user device (e.g., by server 100), the user device may be able to track what OOR confidence level calculation request is most recent and what, if any, reset instruction resulting from suboperation 280 ought to be honored.

When suboperation 280 receives the evaluation data, as gathered by the one or more available branches, to evaluate a confidence level of an OOR event, suboperation 280 (e.g., at the user device, at a remote system server, etc.) may compare the received evaluation data to similar patterns from other user devices (e.g., other users) to determine the confidence level for the OOR event. For example, suboperation 280 of the OOR subprocess may evaluate the user behavior (e.g., communication data, location data, motion data, etc.), any coupling and/or decoupling events, and their associated timings, accuracy, and/or the like. For example, the user behavior may be compared to previous user behavior patterns at the same geolocation at which the current OOR calculation request was triggered and/or to other user's behaviors with a high OOR confidence level.

In case an OOR event was not triggered by expiration of the last resort timer, and right after or when or just prior to when the evaluation data gathered from one or more branches may be combined and/or made available to an OOR confidence level calculation of suboperation 280, the user device may start the confidence delay timer, the expiration of which may trigger an OOR alert event (e.g., the user is finally alerted about the OOR event). If during the countdown of the confidence delay timer, the OOR subprocess evaluates the branch data to determine that the confidence level for the OOR event is not high enough (e.g., at suboperation 280), then the OOR subprocess may generate an OOR cancelation command and the OOR subprocess may be reset (e.g., at suboperation 235) to its state after the last tracking device decoupling event, which may include stopping/resetting the confidence delay timer, while the OOR subprocess may continue running. The OOR subprocess may then start gathering new data from all available branches as if a new tracking device decoupling event had just been detected.

If during the countdown of the confidence delay timer, while the OOR subprocess may be calculating an OOR event confidence level, the tracking device is seen by the user device (e.g., at suboperation 240), an OOR reset command may be provided to suboperation 280 to stop any OOR event confidence level calculation.

If the countdown of the confidence delay timer period expires before any OOR cancelation command may be received, the OOR subprocess may finally alert the user about the OOR event at suboperation 290.

The duration of the confidence delay timer may or may not be the same as the duration of the last resort timer used as the last measure for triggering the OOR alert event if none of the branches are available. In case the expiration of the last resort timer triggers an OOR alert event, the use of the confidence delay timer may be skipped, and the user may be immediately alerted about the OOR alert event. The last resort timer can be from a couple of seconds to a couple of minutes long depending on operating system version and/or user device type and/or any other suitable characteristic(s).

The periodicity or frequency at which suboperation 240 may be run by the user device for detecting the tracking device may be any suitable value (e.g., in a range between every 10 milliseconds and every 60 seconds), where the frequency may vary based on any suitable event(s) or characteristic(s). The periodicity or frequency at which suboperation 240 may be run by the user device may initially be high (e.g., every 10 milliseconds) and then decreased (e.g., prolonged to 1 second) during operation 230. For example, the frequency may remain high (e.g., constant) if none of the capabilities of suboperations 255, 260, and 265 are determined to be available at suboperation 245, but the frequency may be decreased if/when one or more of the capabilities of suboperations 255, 260, and 265 are determined to be available at operation 245 and then executed (e.g., if/when suboperation 265 is executed, then the frequency at which suboperation 240 may be run by the user device for detecting the tracking device may be decreased (e.g., from 10 milliseconds to 1 second between detection attempts of suboperation 240), and if/when operation 230 advances from suboperation 265 to suboperation 270, then the frequency at which suboperation 240 may be run by the user device for detecting the tracking device may be reset or increased (e.g., from 1 second to 10 milliseconds between detection attempts of suboperation 240)). In some embodiments, the periodicity or frequency at which suboperation 260 may be run by the user device (e.g., the frequency at which a determination may be made at suboperation 260 after operation 230 advances from suboperation 245 to suboperation 260) may be any suitable value (e.g., in a range between every 10 milliseconds and every 60 seconds), where the frequency may vary based on any suitable event(s) or characteristic(s). For example, such a frequency of suboperation 260 may be adjusted similarly to how the frequency of suboperation 240 may be adjusted (e.g., based on motion suboperation 265, where when suboperation 265 is triggered to advance to suboperation 270, the frequency of suboperations 240 and 260 may be reset to their original (e.g., quickest) frequency, but where the frequency of suboperations 240 and 260 may gradually or discretely be reduced when suboperation 265 is being run but does not trigger for advancement to suboperation 270). In some embodiments, the periodicity or frequency at which suboperation 255 may be run by the user device (e.g., the frequency at which a determination may be made at suboperation 255 after operation 230 advances from suboperation 245 to suboperation 255) may be any suitable value, such as a value that may be constant throughout operation 230. In some embodiments, the periodicity or frequency at which suboperation 265 may be run by the user device (e.g., the frequency at which a determination may be made at suboperation 265 after operation 230 advances from suboperation 245 to suboperation 265) may be any suitable value, such as a value that may be constant throughout operation 230.

The length of the duration of the last resort timer of suboperation 250 may be any suitable value. The value may be controlled by a user of the user device, by server 100, or the operating system of the user device. The value may be fixed or may vary over time or amongst different tracking devices that have been decoupled. For example, a user device may be running different operations 230 for different tracking devices that have been detected to have been decoupled from the user device, where the length of the duration of the last resort timer may be shorter for the operation 230 associated with a more important tracking device (e.g., a tracking device associated with a user's wallet) and where the length of the duration of the last resort timer may be longer for the operation 230 associated with a less important tracking device (e.g., a tracking device associated with a user's jacket). Additionally or alternatively, the length of the duration of the last resort timer for the operation 230 associated with a particular tracking device may be dynamically adjusted over time based on any suitable characteristic(s) and/or event(s), such as identified duration between previous coupling and decoupling events for that tracking device (e.g., if tracking device is often being coupled and then decoupled at a certain frequency, then the length of the duration of the last resort timer may be increased). Therefore, one or more characteristics (e.g., frequency of suboperations, lengths of timers, confidence level threshold, model types/architecture, etc.) may vary between operation 230 on the user device for a first tracking device and operation 230 on the same user device for a second tracking device, and such variance may be selected by a user and/or automatically through any suitable data analysis. Different confidence level thresholds and confidence delay timers may be utilized, where a confidence level may be adjusted on server side, and/or where a confidence delay timer may be fixed for all use cases or may be network dependent between user device and server. As one example, a first tracking device associated with a more important object (e.g., a wallet) may be associated with a last resort timer that is shorter than that of a second tracking device associated with a less important object (e.g., a jacket). Additionally or alternatively, a first tracking device associated with a more important object (e.g., a wallet) may be associated with a frequency of branch operations that is higher than that of a second tracking device associated with a less important object (e.g., a jacket). Additionally or alternatively, a first tracking device associated with a more important object (e.g., a wallet) may be associated with a confidence level threshold that is lower than that of a second tracking device associated with a less important object (e.g., a jacket). A threshold location change that is to be detected in order to trigger the advancement from suboperation 260 to suboperation 270 may be any suitable threshold that may be adjusted dynamically based on any suitable characteristic(s) and/or event(s), such as accuracy of location signal (e.g., GPS signal vs. BLE, etc.), type of tracking device associated with the operation 230, duration of any suboperation 265, and/or the like. Additionally or alternatively, any of the variable durations, frequencies, thresholds, or the like of operation 230 may be varied based on the type of decoupling event that initiated that operation 230 (e.g., lost connection, BLE disconnected event, BLE signal detection timeout, region exit, UWB signal loss, etc.).

The operations shown in process 200 of FIG. 2 are only illustrative and existing operations may be modified or omitted, additional operations may be added, and the order of certain operations may be altered.

As mentioned, a tracking device may be shared by two or more users and, thus, two or more user devices. For example, as shown in FIG. 1, each one of user device 102 and 102' of user 103 and user device 102a of user 103a may each manage or co-manage tracking device 106. In that case, both the owner and the shared user's user devices 102/102' and 102a may continuously collect the tracking device connection status to the tracking device and, when communicatively coupled to the tracking device, each user device may store (e.g., locally) and/or share (e.g., with the other user device and/or with the tracking system server, etc.) its location and timestamp when it was most recently determined to be communicatively coupled to the tracking device. Therefore, if user device 102 is running the OOR subprocess of operation 230 in order to determine whether or not to trigger an OOR alert event, suboperation 280 of the OOR subprocess may include determining if any other user device (e.g., user device 102a/102') has recently determined itself to be communicatively coupled to the tracking device of interest and if so, compare the location of that user device to the location of user device 102, such that if the locations of the user devices are within a threshold distance of each other, it may be determined that the tracking device is not out of range of user device 102 and may reset the OOR subprocess of operation 230 at user device 102 (e.g., by issuing the OOR cancellation command for transitioning from suboperation 280 to suboperation 235). For example, it may be determined if the tracking device is seen by another nearby the geolocation of the user device, and if the tracking device is at the same geolocation as the user device, the OOR subprocess may only check for geolocation to change significantly before triggering an OOR alert event (see, e.g., FIG. 3, which may illustrate an exemplary portion of the OOR subprocess that may be referred to herein as being carried out by a web server but that may be carried out on a user device). As mentioned, suboperation 280 may be carried out by user device 102 or may be carried out by a remote entity, such as tracking system server 100.

Figure 3:
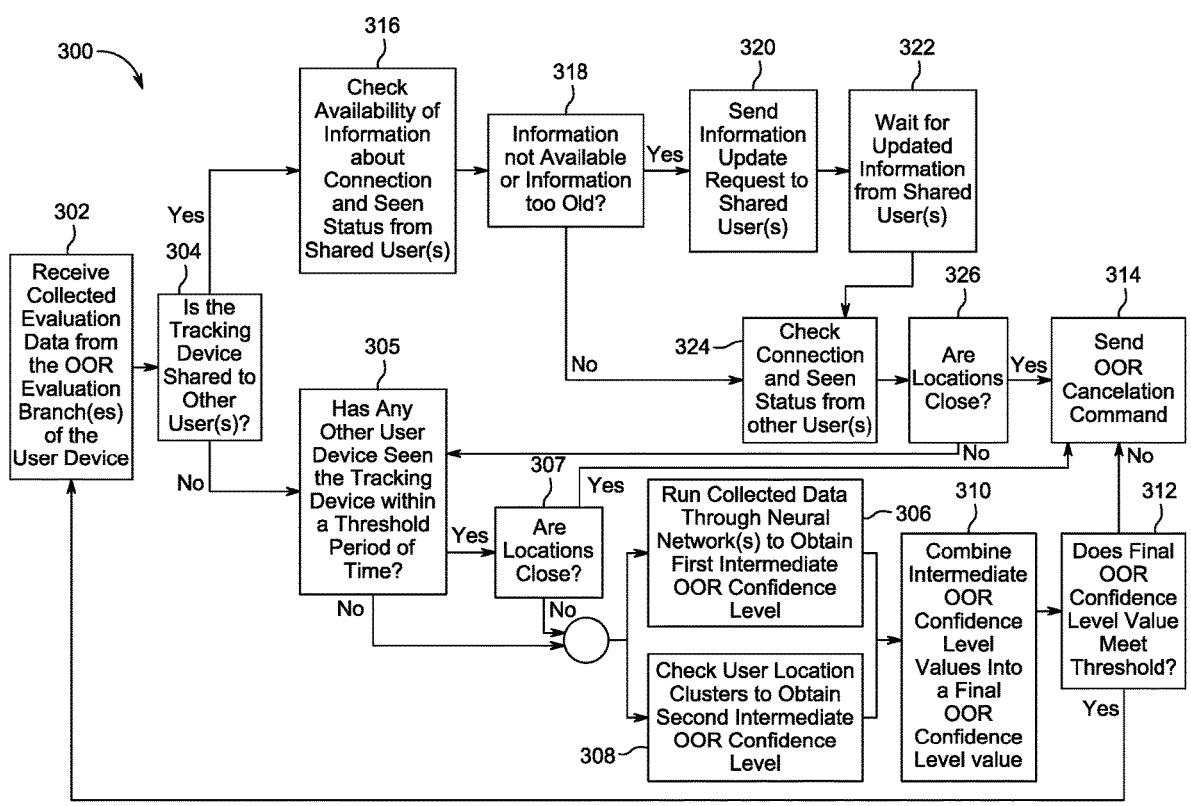
FIG. 3 illustrates a flowchart of an exemplary process for monitoring a tracking device according to some embodiments of the disclosure.

FIG. 3 is a flowchart of an illustrative process 300, which may be a particular illustrative example of suboperation 280 of the OOR subprocess of operation 230 of process 200 of FIG. 2. Like suboperation 280, once, some or each operation of process 300 may be carried out by user device 102 with respect to tracking device 106 or once, some or each operation of process 300 may be carried out by a remote entity, such as tracking system server 100, with respect to user device 102 and tracking device 106. At operation 302, evaluation data collected from each of the available OOR evaluation branch(es) of the user device in response to a potential OOR event of one of the OOR evaluation branches being triggered may be received (e.g., from suboperation 270 of process 200), wherein the received evaluation data may also include any other suitable data, including, but not limited to, a unique identifier of the source user device (e.g., user device 102), a unique identifier of the user of the source user device (e.g., user 103), a unique identifier of the tracking device of interest (e.g., tracking device 106), a unique request identifier associated with the specific confidence level calculation request of suboperation 270 that may provide the received evaluation data, and/or the like. Next, at operation 304, it may be determined whether or not the relevant tracking device of the OOR subprocess (e.g., tracking device 106) is shared to any other device(s). This may be a determination that may be automatically known to the executing entity (e.g., user device 102, tracking system server 100, etc.) or may be determined based on polling one or more other user devices. For example, the executing entity (e.g., user device 102 and/or server 100) may be configured to automatically determine whether tracking device 106 is shared to one or more other user devices or users, such as by utilizing any data that has been previously shared to the executing entity (e.g., any user device (e.g., device 102a, device 102', device 104a-104n, etc.) may automatically be configured to share data relevant to tracking device 106 with managing user device 102 and/or server 100 when that user device is coupled to or sees or otherwise detects any relevant information with respect to the tracking device). If it is determined at operation 304 that the tracking device is not shared to one or more other users, process 300 may advance to operation 305. However, if it is determined at operation 304 that the tracking device may be shared to one or more other users, process 300 may advance to operation 316 for attempting to use data related to at least one of the shared user(s) to skip any OOR confidence level calculation and instead generate an OOR cancellation command.

If it is determined that the tracking device may be shared to one or more other users, process 300 may advance to operation 316, where the executing entity (e.g., user device 102, tracking system server 100, etc.) may check the availability (e.g., locally) of any suitable information about one, some, or any of the shared user(s) relevant to the tracking device, such as connection status, last seen status, location status, and/or the like (e.g., information that may have been shared with the executing entity by the shared user(s)). At operation 318, it may then be determined if such information is not available or is too old. If such information is determined to be not available or if the information is available but is determined to be too old (e.g., older than a predefined threshold), then process 300 may advance from operation 318 to operation 320, otherwise process 300 may advance from operation 318 to operation 324. At operation 320, the executing entity may send a request for updated information to one, some, or each of the shared user(s) and then at operation 322, the executing entity may wait for and receive such requested updated information from one, some, or each of the shared user(s) before advancing to operation 324 (e.g., user device 102 and/or server 100 may send a request to all shared users to return the latest information on whether the shared user (e.g., user device of shared user) sees or does not see or is connected to the tracking device and, if so, any associated location data). At operation 324, whether having arrived there from operation 318 after tracking device data from shared user(s) was determined to be available and not too old or from operation 322 after more updated tracking device data from shared user(s) is received, the executing entity (e.g., user device 102, tracking system server 100, etc.) may check the availability (e.g., locally or through a request for and receipt of remote data) of any suitable information relevant to the tracking device, such as connection status, last seen status, location status, and/or the like from any other user(s) (e.g., user(s) not considered to be a shared user device (e.g., from any other community user device(s) 104*a*-104*n* of any other user(s) 105*a*-105*n* not considered to be a shared user (e.g., shared user 103*a*/user device 102*a*))).

The executing entity may then attempt to determine if a location of the pertinent user device (e.g., user device 102) is within a threshold distance (e.g., close to) a location of any other user device associated with the tracking device of interest, such that it may be determined whether or not the pertinent user device is within a suitable distance of the tracking device such that the OOR subprocess may be appropriately reset or not. For example, after operation 324, process 300 may advance to operation 326, where the executing entity may use any suitable location data of user device 102 (e.g., data from the received collected evaluation data of operation 302 or otherwise) and any suitable location data of another user relevant to the tracking device (e.g., data from any available or received or collected data of operation(s) 316, 322, and/or 324) to determine whether or not the location of the pertinent user device is close to (e.g., within any suitable threshold distance of) the location of the tracking device. If it is determined that the user device is within a suitable threshold distance of the tracking device, process 300 may advance from operation 326 to operation 314, at which the executing entity may send an OOR cancellation command to the user device for resetting the currently running OOR subprocess (e.g., the OOR cancellation command that may be used when advancing from suboperation 280 to suboperation 235 of FIG. 2). Alternatively, if it is determined that the user device is not within a suitable threshold distance of the tracking device, process 300 may advance from operation 326 to operation 305. Therefore, if one of the users sees or is connected to the potentially OOR tracking device, the location of that user may be received and compared to the location of the user device of interest that is running the OOR subprocess. If the locations are close enough (e.g., below a predefined threshold), the OOR confidence level calculation may be immediately stopped and the cancelation request (e.g., OOR cancelation command) may be sent back (e.g., to the user device application (e.g., mobile app) that may be running the OOR subprocess/algorithm).

However, if the above criteria is not met (e.g., no other shared user device sees or is connected to the tracking device or a shared user device sees or is connected to the tracking device but its location is not close to the location of the user device running the OOR subprocess), the executing entity of process 300 may proceed to operation 305. At operation 305, it may be determined whether or not any other user device has seen the tracking device of the OOR subprocess (e.g., tracking device 106) within a threshold period of time. For example, each user device of a system may periodically send information indicative of any tracking device seen by that user device to server 100 (e.g., tracking device identifier, timestamp, user device location (e.g., at any instance of suboperation 270 advancing to suboperation 280 or at any other instance (e.g., every periodic interval, anytime a new tracking device is seen by the user device, etc.))). Each user device of the system that is not a shared device of the tracking device may not be constantly sharing its location data with a server. For example, location data from community devices may be periodically sent to the server, but this data can be encrypted by a device key itself when sent to the server, and the server can be configured to only see the location of the user device at that time, as privacy technology may be used to protect privacy of customers. If no, process 300 may advance from operation 305 to operations 306 and 308 for calculating the OOR confidence level using the received evaluation data. If yes, process 300 may advance from operation 305 to operation 307, where the executing entity may then attempt to determine if a location of the pertinent user device (e.g., user device 102) is within a threshold distance (e.g., close to) a location of the other user device that has seen the tracking device of interest, such that it may be determined whether or not the pertinent user device is within a suitable distance of the tracking device such that the OOR subprocess may be appropriately reset or not. For example, at operation 307, the executing entity may use any suitable location data of user device 102 (e.g., data from the received collected evaluation data of operation 302 or otherwise) and any suitable location data of the other user device to determine whether or not the location of the pertinent user device is close to (e.g., within any suitable threshold distance of) the location of the tracking device. If it is determined that the user device is within a suitable threshold distance of the tracking device, process 300 may advance from operation 307 to operation 314, at which the executing entity may send an OOR cancellation command to the user device for resetting the currently running OOR subprocess (e.g., the OOR cancellation command that may be used when advancing from suboperation 280 to suboperation 235 of FIG. 2). Alternatively, if it is determined that the user device is not within a suitable threshold distance of the tracking device, process 300 may advance from operation 307 to operations 306 and 308 for calculating the OOR confidence level using the received evaluation data. Therefore, if any of the system's user devices sees or is connected to the potentially OOR tracking device, the location of that user device may be received and compared to the location of the user device of interest that is running the OOR subprocess. If the locations are close enough (e.g., below a predefined threshold), the OOR confidence level calculation may be immediately stopped and the cancelation request (e.g., OOR cancelation command) may be sent back (e.g., to the user device application (e.g., mobile app) that may be running the OOR subprocess/algorithm).

The OOR confidence level may be calculated in one or two or more (e.g., parallel) stages, where each one of multiple stages may calculate an intermediate OOR confidence level value, where the intermediate OOR confidence level values may then be combined into one final OOR confidence level value. For example, in a first stage of operation 306, the executing entity may run any available data, including, but not limited to, at least some or all of the collected evaluation data received at operation 302 (e.g., the most recent operation 302 and, optionally, any previous iterations of operation 302), at least some or all of the collected other user device data of operation(s) 316, 322, 324, and/or 305, and/or the like, through one or more neural networks (e.g., pre-trained neural network(s)) to obtain a first intermediate OOR confidence level value. The neural network(s) may be constantly trained by a changing group of beta (e.g., training) users using an extended version of the user device application, which may allow the beta users to mark a triggered OOR event as true or false. Additionally or alternatively, in a second stage of operation 308, the executing entity may check if the user device is inside or close to a precalculated location cluster (e.g., one or more location clusters may be defined in the lifetime of a user using the user device application and may define the locations where the user usually is located (e.g., home, work, free time activities, friend's residence, etc.)). If the user device location is determined to be inside or at the edge of or has just left one such location cluster, the second intermediate OOR confidence level obtained at this stage may be higher than if not determined to be so.

Each computed intermediate OOR confidence level value may then be combined to one final OOR confidence level value at operation 310 (e.g., via averaging, adding together, multiplying, or any other suitable combination). If this final OOR confidence level value is then determined at operation 312 to be below any suitable predefined threshold, process 300 may advance from operation 312 to operation 314, at which the executing entity may send an OOR cancellation command to the user device for resetting the currently running OOR subprocess (e.g., the OOR cancellation command that may be used when advancing from suboperation 280 to suboperation 235 of FIG. 2). Alternatively, if this final OOR confidence level value is determined at operation 312 not to be below any suitable predefined threshold, process 300 may advance from operation 314 back to operation 302 and await to receive any new collected evaluation data from the available OOR evaluation branch(es) without resetting the currently running OOR subprocess, such that a confidence delay timer may expire for enabling the OOR subprocess to advance from suboperation 275 to suboperation 290 for triggering an OOR alert event. The threshold of operation 312 may be any suitable threshold, such as a threshold that may vary over time (e.g., based on user behavior and/or user settings of the user device that lost its tracking device) and/or a threshold that may vary between different types of tracking devices and/or a threshold that may be lowered over time (e.g., as more and more instances of operation 280 occur for a single decoupling event—could lower threshold over time if more and more 280s for a single decoupling event and operation 230 for a particular tracking device), and/or the like.

The operations shown in process 300 of FIG. 3 are only illustrative and existing operations may be modified or omitted, additional operations may be added, and the order of certain operations may be altered.

Figure 4:
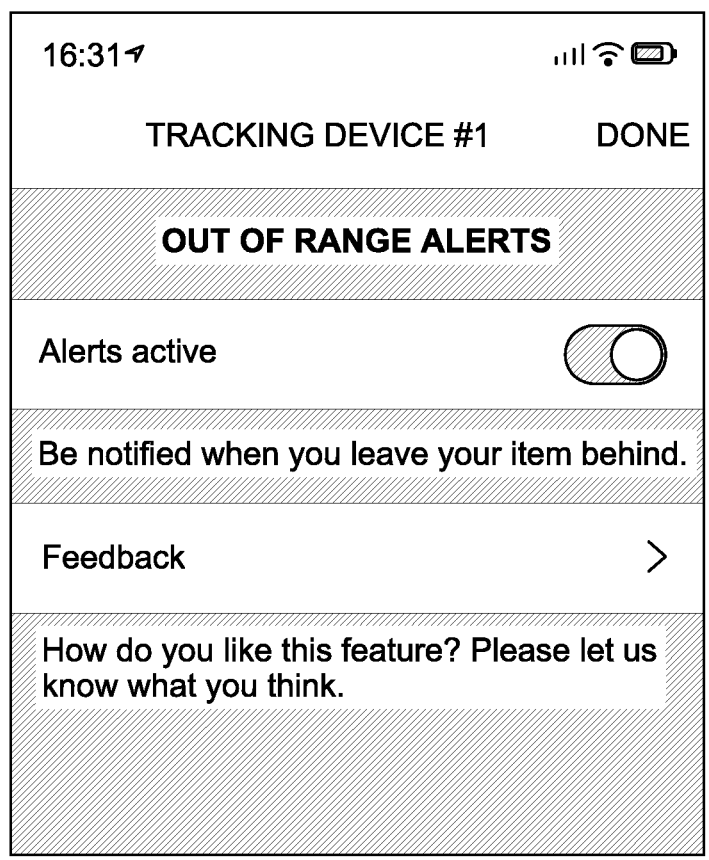
FIGS. 4-6 illustrate exemplary user interfaces of a user device for monitoring a tracking device according to some embodiments of the disclosure.
Figure 5:
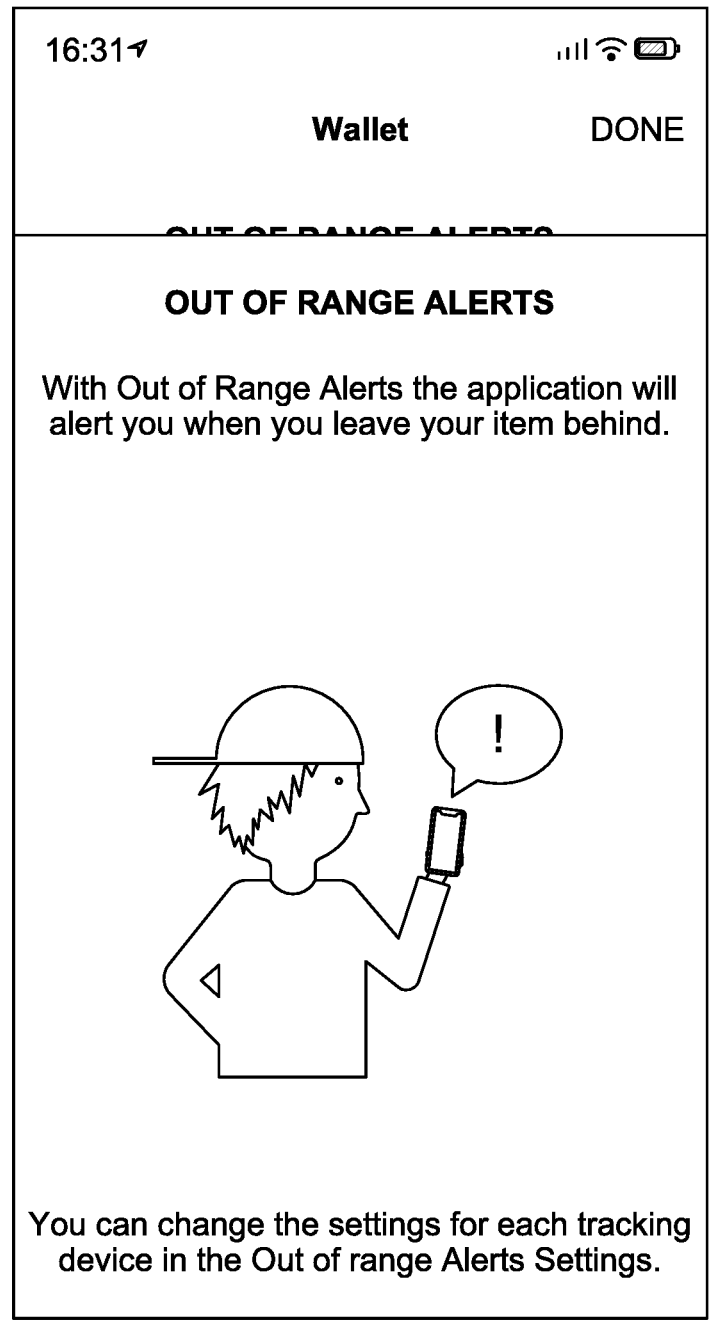
Figure 6:

FIGS. 4-6 may show illustrative user interfaces that may be presented to a user (e.g., by a graphical output component of a user's user device) during different stages of use of this alerts system. For example, a touch screen I/O component 16 may include a display output component that may be used to display a visual or graphic user interface ("GUI"), which may allow a user to interact with the user device. The GUI may include various layers, windows, screens, templates, elements, menus, and/or other components of a currently running application (e.g., application 19 (e.g., an OOR user device mobile application) that may be displayed in all or some of the areas of the display output component. For example, as shown in FIG. 4, user interface 400 may be provided for enabling a user to activate or deactivate OOR alert events for one, some, or each tracking device associated with the user and its user device. As shown in FIG. 5, user interface 500 may be provided for explaining to a user how a user device app may run a process (e.g., process 200 with an OOR subprocess of operation 230) for alerting a user when a tracking device has been determined to be out of range of (e.g., left behind by) the user's user device. As shown in FIG. 6, user interface 600 may be provided (e.g., as a notification or any other suitable graphical or audible or haptic output) for enabling a user of the user device to learn that a tracking device has been determined to be out of range (e.g., due to execution of suboperation 290 of process 200). For each presentation, screens may be displayed on a display output component and may include various user interface elements. Additionally or alternatively, for each presentation, various other types of non-visual information may be provided to a user via various other output components of the user device. For example, in some embodiments, the user device may not include a user interface component operative to provide a GUI but may instead provide an audio output component and mechanical or other suitable user input components for selecting and interacting with an OOR application of the device.

An OOR confidence neural network (e.g., of operation 306) may be any suitable model that may be developed and/or generated for use in evaluating and/or predicting and/or estimating and/or determining an OOR confidence level for particular user device and tracking device and collected evaluation data. For example, such a model may be a learning engine that may be operative to use any suitable machine learning to use certain evaluation data (e.g., one or more various types or categories of evaluation data that may be collected) in order to predict, estimate, and/or otherwise determine a current OOR confidence level. For example, the learning engine may include any suitable neural network (e.g., an artificial neural network) that may be initially configured, trained on one or more sets of evaluation data that may be generated during the performance of one or more known situations, and then used to predict a particular unknown situation based on another set of evaluation data. A neural network or neuronal network or artificial neural network may be hardware-based, software-based, or any combination thereof, such as any suitable model (e.g., an analytical model, a computational model, etc.), which, in some embodiments, may include one or more sets or matrices of weights (e.g., adaptive weights, which may be numerical parameters that may be tuned by one or more learning algorithms or training methods or other suitable processes) and/or may be capable of approximating one or more functions (e.g., non-linear functions or transfer functions) of its inputs. The weights may be connection strengths between neurons of the network, which may be activated during training and/or prediction. A neural network may generally be a system of interconnected neurons that can compute values from inputs and/or that may be capable of machine learning and/or pattern recognition (e.g., due to an adaptive nature). A neural network may use any suitable machine learning techniques to optimize a training process. The neural network may be used to estimate or approximate functions that can depend on a large number of inputs and that may be generally unknown. The neural network may generally be a system of interconnected "neurons" that may exchange messages between each other, where the connections may have numeric weights (e.g., initially configured with initial weight values) that can be tuned based on experience, making the neural network adaptive to inputs and capable of learning (e.g., learning pattern recognition). A suitable optimization or training process may be operative to modify a set of initially configured weights assigned to the output of one, some, or all neurons from the input(s) and/or hidden layer(s). A non-linear transfer function may be used to couple any two portions of any two layers of neurons, including an input layer, one or more hidden layers, and an output (e.g., an input to a hidden layer, a hidden layer to an output, etc.). Different input neurons of the neural network may be associated with respective different types of sensor data categories and may be activated by sensor data of the respective evaluation data categories (e.g., timing patterns, location accuracies, motion activities, etc.), and/or the like may be associated with one or more particular respective input neurons of the neural network and evaluation category data for the particular evaluation category may be operative to activate the associated input neuron(s)). The weight assigned to the output of each neuron may be initially configured using any suitable determinations that may be made by a custodian or processor of the model based on the data available to that custodian.

The initial configuring of the learning engine or head gesture model (e.g., the initial weighting and arranging of neurons of a neural network of the learning engine) may be done using any suitable data accessible to a custodian of the model (e.g., a manufacturer of device 102 and/or its OOR application and/or a controller of server 100 and/or the like), such as data associated with the configuration of other learning engines of system 1 (e.g., learning engines or models for other devices). A learning engine or model may be trained using any beta user evaluation data (e.g., as inputs of a neural network of the learning engine) and using any specifically known data about the situation (e.g., yes out of range or not out of range) as a score (e.g., as an output of the neural network of the learning engine). Any suitable training methods or algorithms (e.g., learning algorithms) may be used to train the neural network of the learning engine, including, but not limited to, Back Propagation, Resilient Propagation, Genetic Algorithms, Simulated Annealing, Levenberg, Nelder-Meade, and/or the like. Such training methods may be used individually and/or in different combinations to get the best performance from a neural network. A loop (e.g., a receipt and train loop) of receiving evaluation category data and a score for the evaluated situation and then training the model using the received evaluation category data and score (e.g., a loop may be repeated any suitable number of times for the same learning engine for more effectively training the learning engine, where the received evaluation category data and the received score received of different receipt and train loops may be for different situations).

One, some, or all of the processes described with respect to FIGS. 1-6 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 of a user device and/or tracking device and/or tracking system server). In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from a central network controller device to a router device or from a data device to any network device. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

Any of the processes described herein for determining whether or not a tracking device is out of range of a user device may provide an intuitive way to monitor attributes of a user device's communication activity, location activity, motion activity, and/or the like for use in determining the likelihood of an OOR event in an efficient and effective manner. Such processes may reduce the cognitive burden on a user when interested in tracking one or more tracking devices, thereby creating a more efficient human-machine interface. For battery-operated computing devices, enabling a user to monitor tracking devices more quickly and more efficiently may conserve power and increase the time between battery charges.

While there have been described systems, methods, and computer-readable media for alerting users of out of range tracking devices, many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the concepts of the disclosure can be practiced by other than the described embodiments, which are presented for purposes of illustration rather than of limitation.

What is claimed is:

1. A method for establishing a tracking device as lost using a user device, wherein the user device comprises a first communication component operative to communicate using a first communication protocol, a second communication component operative to communicate using a second communication protocol, a location determination module operative to determine location of the user device, a motion determination module operative to determine motion of the user device, and a processing module, the method comprising:

periodically attempting to detect, with the processing module, a tracking device decoupling event between the tracking device and the user device via the second communication protocol of the second communication component;

in response to detecting the tracking device decoupling event:
running, with the processing module, an out-of-range ("OOR") process for the tracking device that comprises:
periodically attempting to determine, with the processing module, if the tracking device is detected by the second communication component using the second communication protocol; and
determining, with the processing module, if any OOR evaluation capability of a plurality of OOR evaluation capabilities is currently available to the user device; and
periodically attempting to detect, with the processing module, a tracking device recoupling event between the tracking device and the user device via the second communication protocol of the second communication component, the method further comprising:
in response to detecting the tracking device recoupling event, resetting and stopping, with the processing module, the OOR process for the tracking device;
in response to determining that the tracking device is detected by the second communication component using the second communication protocol, resetting and re-running, with the processing module, the OOR process for the tracking device;
in response to determining that a first OOR evaluation capability of the plurality of OOR evaluation capabilities is currently available to the user device:
periodically collecting, with the processing module, first OOR evaluation data of the first OOR evaluation capability; and
determining, with the processing module, if the collected first OOR evaluation data triggers a potential first OOR evaluation event;
in response to determining that the collected first OOR evaluation data triggers the potential first OOR evaluation event:
combining, with the processing module, all collected OOR evaluation data of the OOR process;
initiating, with the processing module, processing of the combined OOR evaluation data of the OOR process that comprises calculating an OOR confidence level and determining if the calculated OOR confidence level meets a confidence level threshold; and
initiating, with the processing module, a confidence delay timer that has a confidence delay duration;
in response to determining that no OOR evaluation capability of the plurality of OOR evaluation capabilities is currently available to the user device, initiating, with the processing module, a last resort timer that has a last resort duration;
in response to expiration of an initiated last resort timer or expiration of an initiated confidence delay timer, triggering, with the processing module, an OOR alert for the tracking device; and
in response to a determination by the processing of the combined OOR evaluation data of the OOR process that the calculated OOR confidence level does not meet the confidence level threshold, resetting and re-running, with the processing module, the OOR process for the tracking device, wherein the resetting the OOR process for the tracking device comprises stopping and resetting any initiated timer.

2. The method of claim 1, wherein determining that the first OOR evaluation capability of the plurality of OOR evaluation capabilities is currently available to the user device comprises determining that the first communication component is enabled to communicate with a remote device using the first communication protocol.

3. The method of claim 2, wherein:
the first communication protocol comprises a protocol for a local area network; and
the second communication protocol comprises a protocol for a personal area network.

4. The method of claim 3, wherein:
the first communication protocol comprises a Wi-Fi protocol; and
the second communication protocol comprises a Bluetooth Low Energy protocol.

5. The method of claim 2, wherein the first OOR evaluation data comprises at least one of the following:
coupling/decoupling event data between the user device and any other device via the first communication protocol;
strength of any signal communicated between the user device and another device via the first communication protocol; or
a service set identifier of any packet communicated between the user device and another device via the first communication protocol.

6. The method of claim 2, wherein the first OOR evaluation data comprises data indicative of a coupling or decoupling event between the user device and any other device via the first communication protocol that occurred within a particular amount of time prior to the detecting the decoupling event between the tracking device and the user device via the second communication protocol of the second communication component.

7. The method of claim 2, wherein determining that the collected first OOR evaluation data triggers the potential first OOR evaluation event comprises determining that the collected first OOR evaluation data is indicative of a decoupling event between the user device and any other device via the first communication protocol within a particular amount of time before or any time after detecting the tracking device decoupling event.

8. The method of claim 1, wherein determining that the first OOR evaluation capability of the plurality of OOR evaluation capabilities is currently available to the user device comprises determining that the location determination module is enabled to determine location of the user device.

9. The method of claim 8, wherein the determining that the location determination module is enabled to determine location of the user device comprises at least one of the following:
determining that the user device has an active communicative coupling with another device;
determining that the user device's location is determinable based on cellular triangulation;
determining that the user device's location is determinable based on local area network data;
determining that the user device's location is determinable based on indoor location data;
determining that the user device's location is determinable based on stationary personal area network data; or determining that the user device's location is determinable based on personal area network beacons.

10. The method of claim 8, wherein the first OOR evaluation data comprises at least one of the following:
   user device location data;
   timestamp of any user device location data; or
   accuracy information associated with the accuracy of any user device location data.

11. The method of claim 8, wherein the first OOR evaluation data comprises data indicative of the user device's location detected within a particular amount of time prior to the detecting the tracking device decoupling event.

12. The method of claim 8, wherein determining that the collected first OOR evaluation data triggers the potential first OOR evaluation event comprises determining that a change in user device location between the most recently detected user device location and the user device location detected at the time of the detecting the tracking device decoupling event is greater than a particular change threshold.

13. The method of claim 12, wherein the particular change threshold is defined based on at least one of the following
   frequency with which the user device location is determined;
   accuracy of the determined user device location; or
   location type of the user device location at the time of the detecting the tracking device decoupling event.

14. The method of claim 1, wherein determining that the first OOR evaluation capability of the plurality of OOR evaluation capabilities is currently available to the user device comprises determining that the motion determination module is enabled to determine motion of the user device.

15. The method of claim 14, wherein the first OOR evaluation data comprises data indicative of the user device's motion detected within a particular amount of time prior to the detecting the tracking device decoupling event.

16. The method of claim 14, wherein determining that the collected first OOR evaluation data triggers the potential first OOR evaluation event comprises at least one of the following:
   determining that at least a threshold amount of motion of the user device is detected within a particular amount of time;
   determining that a motion of the user device is detected to be constant for a particular amount of time; or
   determining that a particular sequence of motions of the user device is detected with a particular relationship to the tracking device decoupling event.

17. The method of claim 1, further comprising, in response to determining that a second OOR evaluation capability of the plurality of OOR evaluation capabilities is currently available to the user device:
   periodically collecting, with the processing module, second OOR evaluation data of the second OOR evaluation capability; and
   determining, with the processing module, if the collected second OOR evaluation data triggers a potential second OOR evaluation event, wherein:
      the determining that the first OOR evaluation capability of the plurality of OOR evaluation capabilities is currently available to the user device comprises one of:
         determining that the first communication component is enabled to communicate with a remote device using the first communication protocol;
         determining that the location determination module is enabled to determine location of the user device; or
         determining that the motion determination module is enabled to determine motion of the user device; and
      the determining that the second OOR evaluation capability of the plurality of OOR evaluation capabilities is currently available to the user device comprises another one of:
         determining that the first communication component is enabled to communicate with a remote device using the first communication protocol;
         determining that the location determination module is enabled to determine location of the user device; or
         determining that the motion determination module is enabled to determine motion of the user device.

18. The method of claim 17, further comprising, in response to determining that a third OOR evaluation capability of the plurality of OOR evaluation capabilities is currently available to the user device:
   periodically collecting, with the processing module, third OOR evaluation data of the third OOR evaluation capability; and
   determining, with the processing module, if the collected third OOR evaluation data triggers a potential third OOR evaluation event, wherein:
      the determining that the third OOR evaluation capability of the plurality of OOR evaluation capabilities is currently available to the user device comprises the yet another one of:
         determining that the first communication component is enabled to communicate with a remote device using the first communication protocol;
         determining that the location determination module is enabled to determine location of the user device; or
         determining that the motion determination module is enabled to determine motion of the user device.

19. The method of claim 1, wherein the running the OOR process for the tracking device further comprises, in response to determining that the tracking device is detected by the second communication component using the second communication protocol, storing tracking device detection event data that comprises at least one of the following:
   data indicative of a time at which the tracking device was detected by the second communication component using the second communication protocol;
   data indicative of the location of the user device at the time at which the tracking device was detected by the second communication component using the second communication protocol;
   data indicative of a distance between the user device and the tracking device at the time at which the tracking device was detected by the second communication component using the second communication protocol; or
   data indicative of motion of the user device at the time at which the tracking device was detected by the second communication component using the second communication protocol.

20. The method of claim 1, wherein, in response to detecting a tracking device recoupling event, the method further comprises storing tracking device coupling event data that comprises at least one of the following:

data indicative of the time at which the tracking device recoupling event was detected;
data indicative of the location of the user device at the time at which the tracking device recoupling event was detected;
data indicative of a distance between the user device and the tracking device at the time at which the tracking device recoupling event was detected; or
data indicative of motion of the user device at the time at which the tracking device recoupling event was detected.

21. A user electronic device comprising:
a first communication component operative to communicate using a first communication protocol;
a second communication component operative to communicate using a second communication protocol different than the first communication protocol;
a location determination module operative to determine location of the user electronic device;
a motion determination module operative to determine motion of the user electronic device; and
a processing module operative to:
   attempt to detect a tracking device decoupling event between a tracking device and the user electronic device via the second communication protocol of the second communication component;
   in response to a detection of the tracking device decoupling event:
      run an out-of-range ("OOR") process for the tracking device that comprises:
         attempting to determine if the tracking device is detected by the second communication component using the second communication protocol; and
         determining if any OOR evaluation capability of a plurality of OOR evaluation capabilities is currently available to the user electronic device; and
   attempt to detect a tracking device recoupling event between the tracking device and the user electronic device via the second communication protocol of the second communication component, wherein the processing module is further operative to:
      in response to detection of the tracking device recoupling event, reset and stop the OOR process for the tracking device;
      in response to a determination that the tracking device is detected by the second communication component using the second communication protocol, reset and re-run the OOR process for the tracking device;
      in response to a determination that a first OOR evaluation capability of the plurality of OOR evaluation capabilities is currently available to the user electronic device:
         collect first OOR evaluation data of the first OOR evaluation capability; and
         determine if the collected first OOR evaluation data triggers a potential first OOR evaluation event;
      in response to a determination that the collected first OOR evaluation data triggers the potential first OOR evaluation event:
         combine all collected OOR evaluation data of the OOR process;
         initiate processing of the combined OOR evaluation data of the OOR process that comprises calculating an OOR confidence level and determining if the calculated OOR confidence level meets a confidence level threshold; and
         initiate a confidence delay timer that has a confidence delay duration;
      in response to expiration of an initiated confidence delay timer, trigger an OOR alert for the tracking device; and
      in response to a determination by the processing of the combined OOR evaluation data of the OOR process that the calculated OOR confidence level does not meet the confidence level threshold, stop and reset any initiated timer, wherein the determination that the first OOR evaluation capability of the plurality of OOR evaluation capabilities is currently available to the user electronic device comprises one of:
         determining that the first communication component is enabled to communicate with a remote device using the first communication protocol;
         determining that the location determination module is enabled to determine location of the user electronic device; or
         determining that the motion determination module is enabled to determine motion of the user electronic device.

22. A non-transitory machine readable medium storing a program for execution by at least one processing unit of a user device, the program for establishing a tracking device as lost, the program comprising sets of instructions for:
attempting to detect a tracking device decoupling event between the tracking device and the user device via a first communication protocol;
in response to detecting a tracking device decoupling event:
   running an out-of-range ("OOR") process for the tracking device that comprises:
      attempting to determine if the tracking device is detected using the first communication protocol; and
      determining if any OOR evaluation capability of a plurality of OOR evaluation capabilities is currently available to the user device; and
   attempting to detect a tracking device recoupling event between the tracking device and the user device via the first communication protocol, the program comprising additional sets of instructions for:
      in response to detecting a tracking device recoupling event, stopping the OOR process for the tracking device;
      in response to determining that the tracking device is detected using the first communication protocol, restarting the OOR process for the tracking device;
      in response to determining that a first OOR evaluation capability of the plurality of OOR evaluation capabilities is currently available to the user device:
         collecting first OOR evaluation data of the first OOR evaluation capability; and
         determining if the collected first OOR evaluation data triggers a potential first OOR evaluation event;
      in response to determining that the collected first OOR evaluation data triggers the potential first OOR evaluation event:

combining all collected OOR evaluation data of the OOR process;

initiating processing of the combined OOR evaluation data of the OOR process that comprises calculating an OOR confidence level and determining if the calculated OOR confidence level meets a confidence level threshold; and initiating a confidence delay timer that has a confidence delay duration;

in response to expiration of an initiated confidence delay timer, triggering an OOR alert for the tracking device; and in response to a determination by the processing of the combined OOR evaluation data of the OOR process that the calculated OOR confidence level does not meet the confidence level threshold, resetting any initiated confidence delay timer, wherein the collecting first OOR evaluation data of the first OOR evaluation capability comprises one of:

coupling/decoupling event data between the user device and any other device via a second communication protocol that is different than the first communication protocol;

user device location data; or user device motion data.

* * * * *